(12) United States Patent
Shirono et al.

(10) Patent No.: US 7,777,969 B2
(45) Date of Patent: Aug. 17, 2010

(54) CAMERA MODULE AND PORTABLE TERMINAL EMPLOYING THE SAME

(75) Inventors: Masahiro Shirono, Sagamihara (JP); Hirokazu Kabayashi, Kawasaki (JP)

(73) Assignee: Kyocera Corporation, Kyoto (JP)

( * ) Notice: Subject to any disclaimer, the term of this patent is extended or adjusted under 35 U.S.C. 154(b) by 650 days.

(21) Appl. No.: 11/575,866

(22) PCT Filed: Sep. 8, 2005

(86) PCT No.: PCT/JP2005/016540

§ 371 (c)(1),
(2), (4) Date: Mar. 22, 2007

(87) PCT Pub. No.: WO2006/035582

PCT Pub. Date: Apr. 6, 2006

(65) Prior Publication Data

US 2008/0192363 A1  Aug. 14, 2008

(30) Foreign Application Priority Data

Sep. 29, 2004  (JP)  ............... 2004-283041
Sep. 29, 2004  (JP)  ............... 2004-283186
Sep. 29, 2004  (JP)  ............... 2004-283187

(51) Int. Cl.
*G02B 15/14* (2006.01)
*G02B 7/02* (2006.01)

(52) U.S. Cl. ................... 359/698; 359/824
(58) Field of Classification Search .......... 359/698, 359/824
See application file for complete search history.

(56) References Cited

U.S. PATENT DOCUMENTS 5,225,941 A * 7/1993 Saito et al. ............ 359/824
5,786,941 A * 7/1998 Kuwana et al. ........ 359/683
2002/0075571 A1 * 6/2002 Chikami et al. ....... 359/694

FOREIGN PATENT DOCUMENTS

| JP | 04-212909 | 8/1992 |
| JP | 04-212910 | 8/1992 |
| JP | 04-212913 | 8/1992 |

(Continued)

*Primary Examiner*—Jordan M. Schwartz
*Assistant Examiner*—James C Jones
(74) *Attorney, Agent, or Firm*—Hogan Lovells US LLP

(57) ABSTRACT

A camera module in which a lens holder holding one or more optical lenses is movable in the direction of the optical axis and in which an auto-focus function and a zoom function are incorporated is reduced in size and weight. A bearing section is formed in the lens holder, and a drive shaft is inserted in the bearing section. An operation part of a piezo element is made to be in contact with the drive shaft. The surface of that first part of the drive shaft which is in contact with the operation part and the surface of that second part which slides on the bearing section are differently processed.

18 Claims, 32 Drawing Sheets

FOREIGN PATENT DOCUMENTS

| | | |
|---|---|---|
| JP | 05-107440 | 4/1993 |
| JP | 07-063970 | 3/1995 |
| JP | 07-104166 | 4/1995 |
| JP | 07-184382 | 7/1995 |
| JP | 08-047273 | 2/1996 |
| JP | 08-179184 | 7/1996 |
| JP | 09-037575 | 2/1997 |
| JP | 10-090584 | 4/1998 |
| JP | 11-160599 | 6/1999 |
| JP | 2980541 | 9/1999 |
| JP | 2000-040313 | 2/2000 |
| JP | 2001-045777 | 2/2001 |
| JP | 2003-015014 | 1/2003 |
| JP | 2004-007914 | 1/2004 |
| JP | 2004-264809 | 9/2004 |
| WO | WO 00/25369 | 5/2000 |
| WO | WO 00/74153 A1 | 12/2000 |

\* cited by examiner (A)

(B)

CAMERA MODULE AND PORTABLE TERMINAL EMPLOYING THE SAME

TECHNICAL FIELD

The present invention relates to a camera module and a portable terminal including this camera module, more particularly to a camera module constituted to be small and light and a portable terminal including this camera module.

BACKGROUND ART

In recent years, with high pixilation of an image pickup device (a CCD), a camera module for use in a portable terminal such as a cellular phone is required to have functions similar to those of a usual electronic camera (a digital camera), such as a high-speed high-precision auto-focus (AF) function and a focal length change (zoom) function. Furthermore, with miniaturization and lightening of the portable terminal itself, it is necessarily demanded that the camera module should be miniaturized and lightened.

In order to perform auto-focusing and changing of a focal length (zooming) in such a camera module, a lens unit needs to be moved in an optical axis direction. To achieve this, in a conventional technology, as described in, for example, Patent Document 1, a cylindrical cam is disposed on a side surface of an optical system. Moreover, a bearing of the cylindrical cam and a bearing of a lens frame are arranged on a front cover (a fixed frame), and driven by a motor, and a zoom lens frame and an AF lens frame are driven. Furthermore, a solid image pickup device (the CCD) is directly disposed in a housing (a case), and a rotation angle of the cylindrical cam is detected by a cam and a mechanical switch which are arranged on the side surface of the cylindrical cam to detect the rotation angle.

Furthermore, when the AF lens frame and the zoom lens frame are driven, the cylindrical cam provided with continuously formed cam regions for magnification change photographing and macro photographing is disposed adjacent to the lens frame. This cam is driven by a stepping motor disposed on a cylindrical cam side surface side to move a photographing optical system in an optical axis direction. In this case, two points, so-called telephoto and macro points can be switched.

Moreover, the stepping motor is provided integrally with a lead screw, and the lead screw is independently held by holding members together with the stepping motor. Attachment members to attach these holding members to a housing which is a lens barrel substrate are arranged on only one side of the lead screw. Here, the zoom and AF lens frames are driven by two lead screws, the housing is provided with guide support portions of the lens frames, and the CCD is disposed in a lower part of the housing.

In addition, a focus motor and a zoom motor for driving photographing lenses and a shutter motor and an aperture stop motor for driving an inner mechanism are arranged. These motors are arranged in first to fourth quadrants obtained by dividing a plane crossing an optical axis of each photographing lens at right angles by first and second axes which cross the optical axis at right angles and which cross each other at right angles, respectively. A base of a shutter unit is provided with cutout portions for passing rotary center axes of the focus motor and the zoom motor.

Moreover, a bearing section which rotatably holds two screw shafts and two lens frame guide shafts in a main body is integrally formed with an upper housing by molding by use of a plurality of slide molds having different slide directions. A movable lens frame for zoom and AF lenses are driven by the screw shafts in the optical axis direction. Furthermore, a CCD is held in a lower housing.

However, in such a conventional camera module using the cylindrical cam, the lead screws, helicoids and the like, an electromagnetic motor and a pulse motor having rotors are generally used as driving sources of the module. However, the electromagnetic motor using such a rotor requires an electromagnet and a permanent magnet for the rotor and around the rotor. Even when a length in an axial direction is reduced, a columnar portion is indispensable. This hampers the miniaturization of the camera module. Furthermore, noises and the like are generated.

Therefore, in order to solve shortcomings of such an electromagnetic motor, as the driving source which moves the lens frames in the optical axis direction, a frictional driving type driving source has heretofore been used in which a mechanical vibrator is constituted of a piezoelectric element such as a piezo element (a PZT) to generate a mechanical strain in accordance with changes of an electric field and a magnetic field. The rotor or a slider is brought into contact with this mechanical vibrator to take out a vibration of the mechanical vibrator as an output. Such a frictional driving type driving source operates at a low speed but has advantages that the source has a high torque and excellent response and controllability, can finely be positioned, has a holding torque (or a holding force) when not energized, has excellent quietness and is small and light.

To solve the problem, it is proposed that a piezo element be used as a driving source. It is described in, for example, Patent Document 2 that one end of a laminated piezoelectric article is fixed to a protrusion of an outer peripheral surface of a lens holding unit, one end of a bimorph piezoelectric article is fixed to the other end of the piezoelectric article, and another bimorph piezoelectric article is fixed on a side opposite to the protrusion. When a voltage turns on, these bimorph piezoelectric articles are bent to disconnect engagement members on distal ends of the articles clamped to an inner surface of a lens barrel. Moreover, when the voltage turns on, a laminated piezoelectric element elongates. When the voltage turns off, the bimorph piezoelectric article returns to its original shape, and is clamped to the lens barrel. Furthermore, when the voltage turns off, the laminated piezoelectric element returns to its original length. In consequence, the bimorph piezoelectric articles are alternately clamped. Moreover, the laminated piezoelectric article is elongated and restored, and a lens is moved forwards and backwards.

Moreover, it is described in Patent Document 3 that the piezoelectric element is brought close to a rotary feed member for feeding the lens holding unit, and this piezoelectric element rotates the rotary feed member in a stepping manner. Here, the piezoelectric element is brought into contact with a circumference of an end portion of a feed screw for driving the lens frame.

Furthermore, it is described in Patent Document 4 that two types of piezoelectric elements are integrally attached to a guide member which guides the lens holding unit, and these piezoelectric elements alternately perform an expanding and contracting operation to allow the guide member to perform an intermittent feed operation. Here, the piezoelectric element is disposed on the end portion of the feed screw for driving the lens holding unit.

Moreover, it is described in Patent Document 5 that an electrical-mechanical energy conversion element (a piezoelectric element) vibrated by applying an electrical signal is brought into contact with an output member having a screw portion, and a movable member is allowed to abut on the screw portion of the output member to thereby rotate this output member by vibration of the conversion element. In consequence, when the screw portion rotates, the movable member is moved in an axial direction of the output member. Here, the piezoelectric element is disposed around a cylindrical portion of the feed screw end portion.

In addition, it is described in Patent Document 6 that a sleeve portion integrated with the lens barrel is slidably fitted into a guide bar. Moreover, a vibrator of a linear driving type vibration wave actuator is brought into contact under pressure with the outer peripheral surface of a sleeve portion via a leaf spring, and two alternating voltages having a predetermined phase difference are applied to the piezoelectric element to thereby apply a thrust to the sleeve portion in the axial direction, and the lens barrel is moved along the optical axis. Moreover, with respect to one movable lens frame, each ceramic vibrator is disposed on either the movable lens frame or a fixing portion (the lens barrel) of a lens device, the ceramic vibrator is brought into contact under pressure with a part of either the movable lens frame or the fixing portion on which any ceramic vibrator is not disposed, and the lens is driven by an elliptic motion of the ceramic vibrator.

Furthermore, as shown in FIG. 36, a lens holding unit 1 is engaged with a screw portion 3 of a driving shaft 2 disposed rotatably around an axis, a vibrator 4 including a piezoelectric element is allowed to abut on a peripheral surface of the driving shaft 2, and the driving shaft 2 is rotated by the vibration of the vibrator 4 to move the lens holding unit 1 forwards and backwards along an axial direction of the driving shaft 2.

In addition, as shown in FIG. 37, a piezoelectric vibrator 5 is pressed onto a guide member 8 by a leaf spring 6, the piezoelectric vibrator 5 is stored in a sleeve section of a movable lens holding member 7, a transmission member for converting a rotating motion of a motor into a linear motion is eliminated to improve a space efficiency, and a lens driving device is miniaturized.

It is to be noted that as the driving source using the piezo element, for example, in Patent Document 7, a driving source is described which includes at least one rectangular piezoelectric plate having a long edge portion, a short edge portion and first and second surfaces. Electrodes are attached to the first and second surfaces. Moreover, a ceramic spacer is attached to the center of a first edge portion of the edge portions, an elastic force is applied to the center of a second edge portion opposite to the first edge portion to press the ceramic spacer onto an object, and either of an alternating voltage and an asymmetric single polarity pulse voltage is applied to the electrodes.

Moreover, similarly as the driving source using the piezo element, in Patent Document 8, a driving source is disclosed which includes a first piezoelectric plate having first and second long sides, first and second short sides, front and back surfaces surrounded with the long and short sides, a plurality of electrodes connected to this front surface and a counter electrode connected to the back surface; and a second piezoelectric plate having first and second long sides, first and second short sides, front and back surfaces surrounded with the long and short sides, a plurality of electrodes connected to the front surface and a counter electrode connected to the back surface. A first spacer is attached to the first long side at one end in the vicinity of the first short side of the first piezoelectric plate, and engaged with the surface of the object. A second spacer is attached to the first long side at one end in the vicinity of the first short side of the second piezoelectric plate, and engaged with the surface of the object to press the spacers onto the surface of the object. The first short side of the first piezoelectric plate is disposed substantially in parallel with and close to the first short side of the second piezoelectric plate so as to apply exciting voltages to the plurality of electrodes.

Furthermore, similarly as the driving source using the piezo element, in Patent Document 9, a driving source is disclosed which includes a piezoelectric plate having two long edge portions, two short edge portions and a spacer attached to one of the long edge portions; and at least one arm constituted to be rotatable around the axial center. The arm is provided with first and second end portions disposed at opposite ends of the arm which are distant from the axial center; a read/write head attached to the first end portion of the arm; and a rigid member disposed on the second end portion. The spacer of the piezoelectric plate is elastically urged toward the rigid member so that the piezoelectric plate is movable with respect to the axial center.

Similarly as the driving source using the piezo element, in Patent Document 10, a driving source is disclosed in which a plurality of electrodes are arranged on one surface of a piezoelectric plate, a counter electrode is disposed on the other surface, a head is disposed at one end of an arm rotatable around an axis, a rigid member is disposed at the other end of the arm, and the piezoelectric plate is elastically urged toward the rigid member.

Furthermore, similarly as the driving source using the piezo element, in Patent Document 11, a driving source is disclosed in which the piezo element causes a motion in a first direction, when a voltage is applied between a first electrode group and a common electrode. A motion is caused in a second direction, when a voltage is applied between a second electrode group and the common electrode. A switch connects the first and second electrode groups to a constant voltage to selectively cause the motion in the first or second direction.

In addition, similarly as the driving source using the piezo element, in Patent Document 12, a driving source is disclosed in which a vibrator has a rectangular parallelepiped shape formed of a plurality of thin layers constituted of a piezoelectric material. This layer includes first and second comparatively large square main surfaces which are identical to each other. Each main surface is defined by a long end surface and a short end surface, layers are laminated, the main surfaces are bonded to each other so that electrodes are present on the surfaces of the layers, and a contact region is disposed on one or more end surfaces of the layers. In consequence, a voltage is applied to each electrode in order to excite a vibration in the contact region.

Patent Document 1: Japanese Patent Application Laid-Open No. 7-63970;

Patent Document 2: Japanese Patent Application Laid-Open No. 5-107440;

Patent Document 3: Japanese Patent Application Laid-Open No. 4-212913;

Patent Document 4: Japanese Patent Application Laid-Open No. 4-212910;

Patent-Document 5: Japanese Patent Application Laid-Open No. 8-47273;

Patent Document 6: Japanese Patent Application Laid-Open No. 7-104166;

Patent Document 7: Japanese Patent Application Laid-Open No. 7-184382;

Patent Document 8: Japanese Patent No. 2980541;

Patent Document 9: Japanese Patent Application Laid-Open No. 9-37575;

Patent Document 10: Japanese Patent Application Laid-Open No. 2000-40313;

Patent Document 11: Japanese Patent Publication No. 2002-529037; and

Patent Document 12: Japanese Patent Publication No. 2003-501988.

DISCLOSURE OF THE INVENTION

Problem to be Solved by the Invention

However, since technologies described in Patent Documents 2 to 5 are mechanisms to drive a camera lens having a usual size and a camera module for use in a portable terminal such as a cellular phone is constantly required to be miniaturized, the mechanisms are too large to be applied to such a portable terminal. Moreover, even when a piezo element is used, a lens holding member and the piezo element exist independently of each other. The lens holding member is moved by a slider or the like. Therefore, it is difficult to constitute a small constitution, and there is also a problem that the constitution becomes complicated.

Therefore, an object of the present invention is to provide a camera module which can be constituted to be small and light even in a case where an auto-focus (AF) function or a zoom function is incorporated, and a portable terminal including this camera module.

Means for Solving the Problem

To solve the above problems, the present invention proposes a camera module comprising; a lens holding unit which holds at least one or more optical lenses and which includes a first bearing section, a first shaft member which is inserted into the first bearing section and which is substantially disposed in parallel with an optical axis, and a piezo element including, at an end portion thereof, an operating portion which abuts on the first shaft member, the element being disposed in the lens holding unit, in which surface processing of the first shaft member at a first place to abut on the operating portion differs from that at a second place to slide on the first bearing section.

Moreover, in the present invention, the surface of the second place which slides on the first bearing section is treated to be smoother than the surface of the first place which abuts on the operating portion, or the surface of the first place which abuts on the operating portion is treated to be rougher than the surface of the second place which slides on the first bearing section. A friction coefficient between the first bearing section and the first shaft member is set to be smaller than that between the operating portion and the first shaft member. Alternatively, the surface of the second place which slides on the first bearing section is subjected to a lubrication treatment, and the lubrication treatment is omitted from the surface of the first place which abuts on the operating portion.

Thus, the surface processing of a surface of the first shaft member which abuts on the operating portion of the piezo element is set to be different from that of a surface which slides on the first shaft member. On a side which abuts on the operating portion, the friction coefficient is set to be high, or the lubrication treatment is omitted. On a side which slides on the bearing, the friction coefficient is set to be small, or the lubrication treatment is performed. In consequence, a driving force of the piezo element can efficiently be transmitted to the shaft member. Moreover, the lens holding unit can smoothly move. The camera module having incorporated auto-focus (AF) and zoom functions can be constituted to be small and light.

Moreover, the first bearing section has a substantially V-shaped section, and the V-shaped section slides on the first shaft member. Furthermore, the first bearing section has V-shaped sections at two places of the first shaft member in an axial direction, and the operating portion is positioned between the V-shaped sections at two places. In consequence, an abutment surface of the first bearing section which slides on the first shaft member comes into linear contact, and has much reduced resistance. Furthermore, since the operating portion is positioned between the V-shaped sections at two places, a pressing force by which the operating portion presses the first bearing section via the first shaft member becomes uniform with respect to the V-shaped sections of two places. The lens holding unit can move more smoothly.

Furthermore, in the present invention, the camera module further comprises: a second bearing section disposed in the lens holding unit; and a second shaft member which is inserted into the second bearing section and which is disposed in a position substantially parallel to the optical axis and substantially symmetric with respect to the first shaft member via an optical axis, the surface of the second shaft member being subjected to substantially the same surface processing as that of the surface of the second place of the first shaft member which slides on the first bearing section. In consequence, a resistance between the second shaft member and the second bearing section is reduced, and the lens holding unit can move more smoothly.

Moreover, to solve the above problem, according to the present invention, a camera module includes; a lens holding unit which holds at least one or more optical lenses and which includes a first bearing section, a first shaft member which is inserted into the first bearing section and which is substantially disposed in parallel with an optical axis, a piezo element including, at an end portion thereof, an operating portion which abuts on the first shaft member, the element being disposed in the lens holding unit to move the lens holding unit, and a second shaft member which guides the lens holding unit, and at least the first shaft member or the second shaft member is configured to supply an electric signal to drive the piezo element.

Since the camera module is constituted in this manner, the piezo element has advantages that the element operates at a low speed but has a high torque and has excellent response and controllability, that micro positioning is possible, that even when the element is not energized, the element has a holding torque (or a holding force), and that the element is also quiet, small and light. Therefore, when the piezo element is driven to vertically move the lens holding unit, zooming or focusing can be performed. The camera module having an auto-focus (AF) function and a zoom function can be constituted to be small and light.

In such a camera module, electric signals such as a source power, a driving signal and an earth signal have heretofore been supplied to a motor generally by use of a flexible substrate and a flexible cable. However, when such flexible substrate and flexible cable are used in the small and light camera module, a weight increases. Moreover, since the motor moves, movement regions of the flexible substrate and the flexible cable need to be secured. Therefore, the camera module enlarges.

However, when the electric signal is supplied from the first shaft member or the second shaft member, it is not necessary to secure the movement regions of the flexible substrate and the flexible cable. Therefore, the camera module can be constituted to be small. This merit enlarges especially in a case where a movement distance of the lens holding unit holding the driving member increases.

Moreover, in the present invention, the camera module further comprises: a first lens holding unit and a second lens holding unit each including the piezo element, a first piezo element stored in the first lens holding unit being drivable by a signal of a first frequency, a second piezo element stored in the second lens holding unit being drivable by a signal of a second frequency, the camera module further comprising: a common signal supply member which supplies the signal of the first frequency to the first piezo element and which supplies the signal of the second frequency to the second piezo element.

Thus, the driving frequency of the piezo element disposed in a lens holding unit main body is set so as to differ with each lens holding unit. In consequence, when the frequency of an (electric) signal such as the source power, the driving signal or the earth signal to be supplied is simply adjusted in accordance with the piezo element held by the lens holding unit to be moved, a plurality of lens holding units can independently be moved vertically, respectively. A control circuit of the piezo element can be simplified. Therefore, in a case where the camera module is constituted in this manner, when the piezo elements are separately driven, the plurality of lens holding units can move vertically independently of one another, and zooming and focusing can be performed. Therefore, the camera module having the auto-focus (AF) and zoom functions can be constituted to be small and light.

Furthermore, since the camera module further comprises first signal supply means capable of selectively supplying the signal of the first frequency and the signal of the second frequency to the signal supply member, the signals of two frequencies can be supplied by single signal supply means. The camera module further comprises: second signal supply means capable of superimposing the signal of the first frequency and the signal of the second frequency to supply the signals to the signal supply member; first filter means for acquiring the signal of the first frequency from the signal supplied from the signal supply member; and second filter means for acquiring the signal of the second frequency from the signal supplied from the signal supply member, the camera module being configured to supply an output of the first filter means to the first piezo element and to supply an output of the second filter means to the second piezo element. Therefore, the signals of the first and second frequencies can be taken from the superimposed electric signal to drive both the piezo elements simultaneously. It is possible to provide the camera module which can also perform the zooming and the focusing quickly.

Moreover, the lens holding unit includes a second bearing section which abuts on the second shaft member, and supplies the electric signal via one or both of the first and second bearing sections. In consequence, since the electric signal can be supplied from the vicinity of the driving member, a lead wire or the like can be shortened. Furthermore, the lens holding unit includes a sliding member which comes into slidable contact with the shaft member, and supplies the electric signal via the sliding member. Alternatively, the sliding member surrounds the shaft member and urges the piezo element to abut on the shaft member. Therefore, the sliding member also serves as the urging member of the driving member with respect to the shaft member. Therefore, the number of the components can be reduced to constitute a small camera module having a satisfactory assembly property.

Furthermore, in the present invention, the camera module further comprises: urging means which is disposed in the lens holding unit and which urges the piezo element in a direction in which the operating portion abuts on the first shaft member.

In addition, to solve the above problem, the present invention proposes a portable terminal comprising; a camera module including a lens holding unit which holds at least one or more optical lenses and which includes a first bearing section, a first shaft member which is inserted into the first bearing section and which is substantially disposed in parallel with an optical axis and a piezo element including, at an end portion thereof, an operating portion which abuts on the first shaft member, the element being disposed in the lens holding unit, in which surface processing of the first shaft member at a first place which abuts on the operating portion differs from that at a second place which slides on the first bearing section; an operation member; a display; a battery; a communication unit; and a housing which stores the camera module, the display, the battery and the communication unit, a thickness of the housing being limited substantially to a height of the camera module.

Similarly, there is obtained a portable terminal comprising; a camera module including a lens holding unit which holds at least one or more optical lenses, a driving member which movably drives the lens holding unit and a guide shaft member which guides the lens holding unit or a shaft member which transmits a driving force to the lens holding unit via the driving member, the camera module being configured to supply an electric signal for driving the driving member to at least the shaft member or the guide shaft member; and an operation member; a display; a battery; a communication unit; and a housing which stores the camera module, the display, the battery and the communication unit, a thickness of the housing being limited substantially to a height of the camera module.

Furthermore, there is similarly obtained a portable terminal comprising; a camera module including, a lens holding unit which holds at least one or more optical lenses and which includes a first bearing section, a first shaft member which is inserted into the first bearing section and which is substantially disposed in parallel with an optical axis, a piezo element including, at an end portion thereof, an operating portion which abuts on the first shaft member, the element being disposed in the lens holding unit and a second shaft member which guides the lens holding unit, surface processing of the first shaft member at a first place to abut on the operating portion being different from that at a second place to slide on the first bearing section, at least the first shaft member or the second shaft member being configured to supply an electric signal to drive the piezo element;

an operation member; a display; a battery; a communication unit; and a housing which stores the camera module, the display, the battery and the communication unit, a thickness of the housing being limited substantially to a height of the camera module.

Moreover, the camera module further includes: a first lens holding unit and a second lens holding unit each including the piezo element, a first piezo element stored in the first lens holding unit is drivable by a signal of a first frequency, a second piezo element stored in the second lens holding unit is drivable by a signal of a second frequency, and the camera module further includes a common signal supply member which supplies the signal of the first frequency to the first piezo element and which supplies the signal of the second frequency to the second piezo element.

Advantages of the Invention

As described above, according to the present invention, there is an effect that even a camera module in which an auto-focus (AF) function and a zoom function are incorporated, and a portable terminal including this camera module can be constituted to be small and light.

Figure 1:
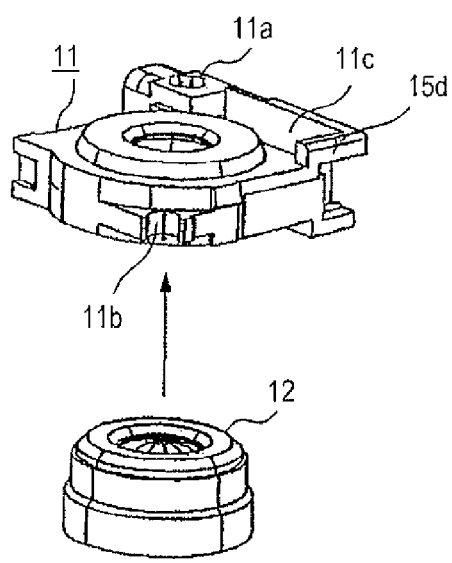
FIG. 1 is a perspective view showing a state in which an optical lens is attached to a lens holder (a second lens holder) for use in Example 1 of the present invention.

DESCRIPTION OF REFERENCE NUMERALS 10, 15 lens assemblies;
11, 16 lens holders;
11a, 11b, 16a and 16b bearing sections;
11c, 16c piezo element holding sections;
13, 18 fixing members;
14b, 19b wiring members;
20, 20a piezo elements;
24g capacitor;
24h inductor;
24k, 24m position detecting sensor;
26 guide shaft;

27 driving shaft; and
30 CCD assembly.

BEST MODE FOR CARRYING OUT THE INVENTION

Preferable examples of an embodiment will hereinafter be described illustratively in detail with reference to the drawings. However, dimensions, materials, shapes, relative arrangements and the like of constituting components described in the examples do not limit the scope of the invention, and are merely explanatory examples unless otherwise described.

Example 1

Figure 7:
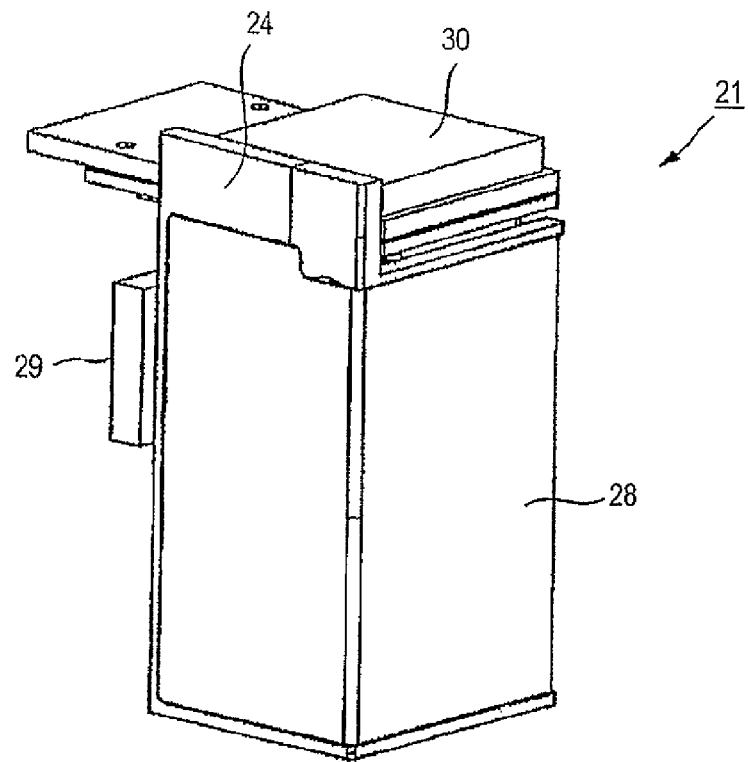
FIG. 7 is a perspective view showing an appearance of an inverted camera module according to Example 1 of the present invention.
Figure 8:
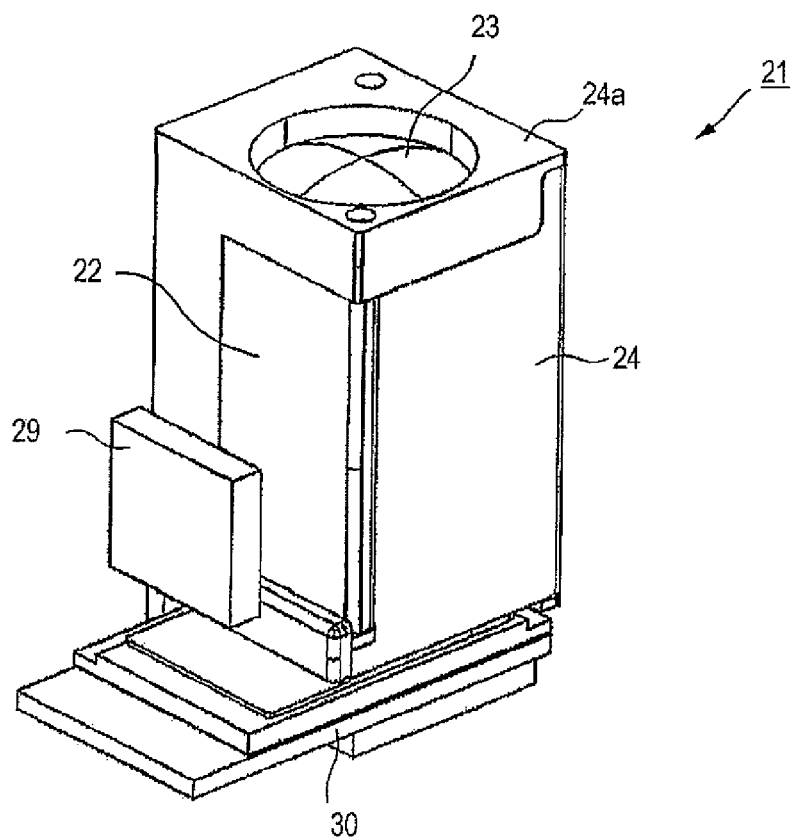
FIG. 8 is a perspective view showing an appearance of the camera module according to Example 1 of the present invention.

FIGS. 7, 8 are perspective views showing an appearance of a camera module 21 in an embodiment of Example 1 in which a first lens assembly 10 and a second lens assembly 15 described hereinafter are incorporated, FIG. 7 is a perspective view showing, as an upper side, a side of a CCD assembly 30 which is an image pickup element, and FIG. 8 is a perspective view showing, as an upper side, a side of a holder section 24a in which an optical lens 23 on a subject side is incorporated. In the drawing, reference numeral 24 is a case, 28 is a side cover (shield cover), and a camera module housing 22 (FIG. 8) in which the first lens assembly 10 and the second lens assembly 15 are incorporated is disposed in the case 24 and the side cover 28. Furthermore, an ASIC (a third wiring member) 29 is disposed which connects these first lens assembly 10 and second lens assembly 15 to the CCD assembly 30.

Figure 2:
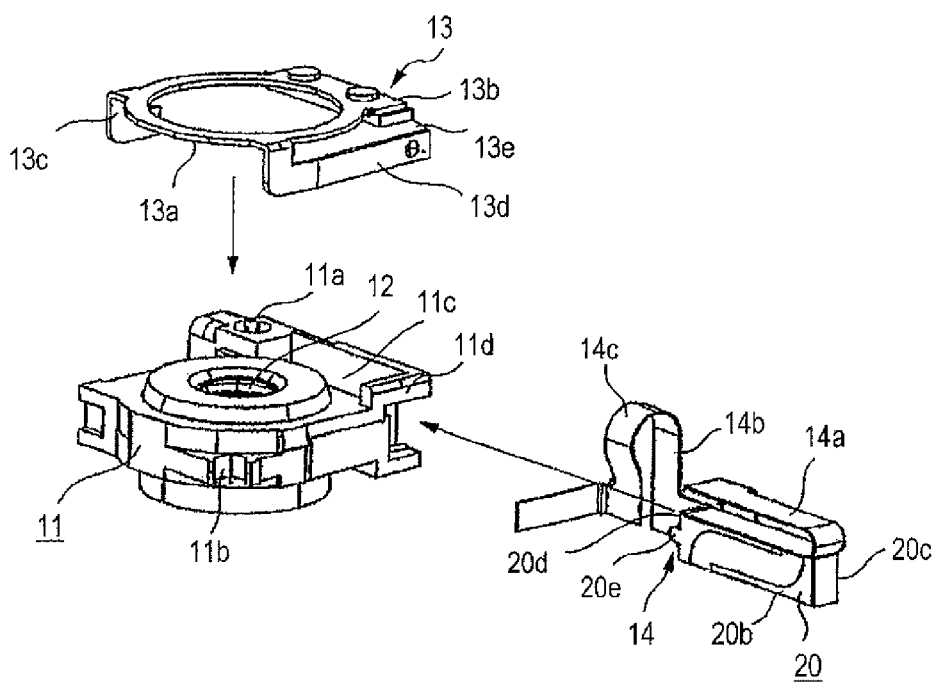
FIG. 2 is an exploded perspective view showing a lens assembly (a second lens assembly) for use in Example 1 of the present invention.
Figure 3:
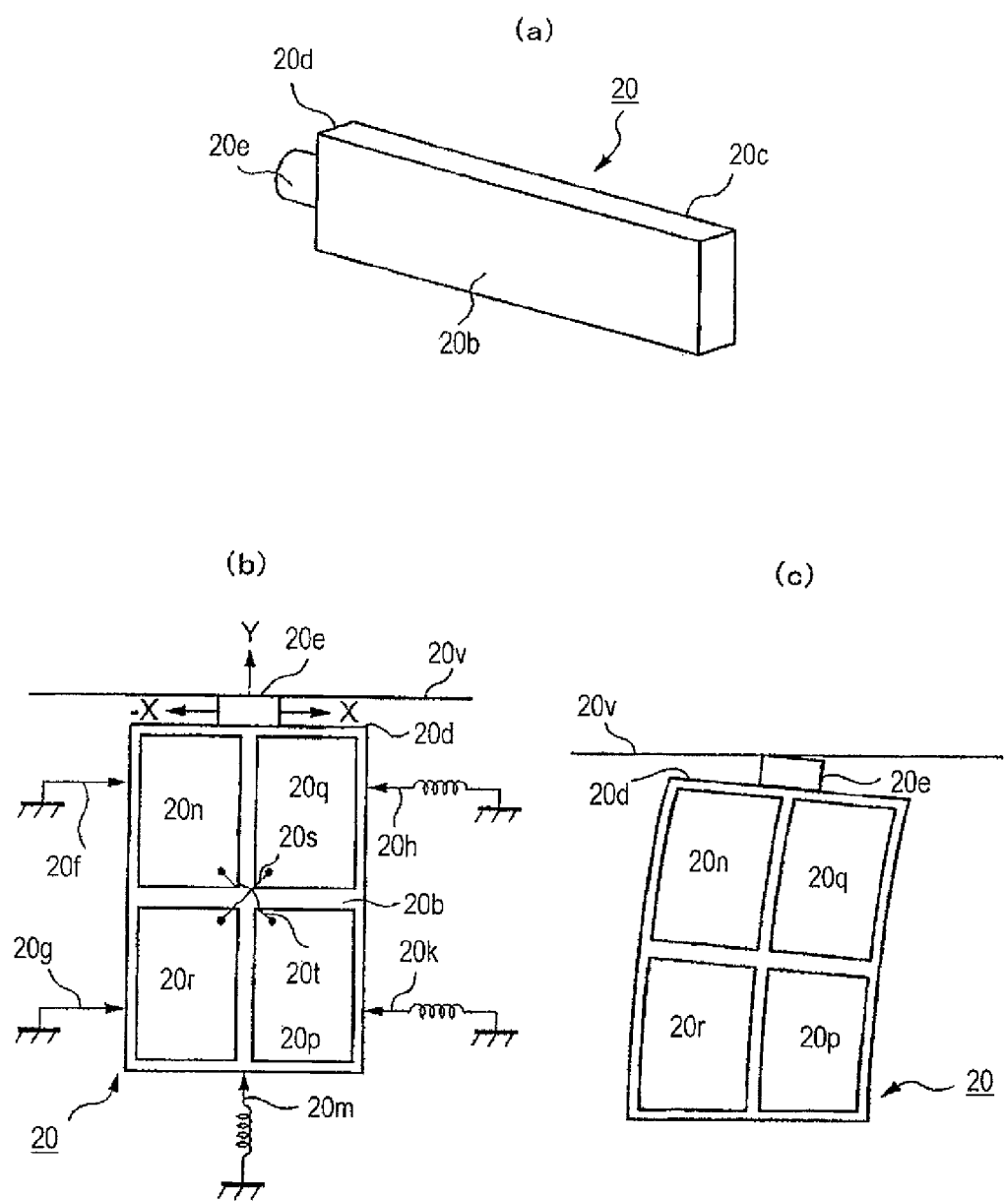
FIG. 3 is an explanatory view of a piezo element for use in Example 1 of the present invention, (a) is a perspective view showing the piezo element, and (b) and (c) are explanatory views of an operation principle.
Figure 4:
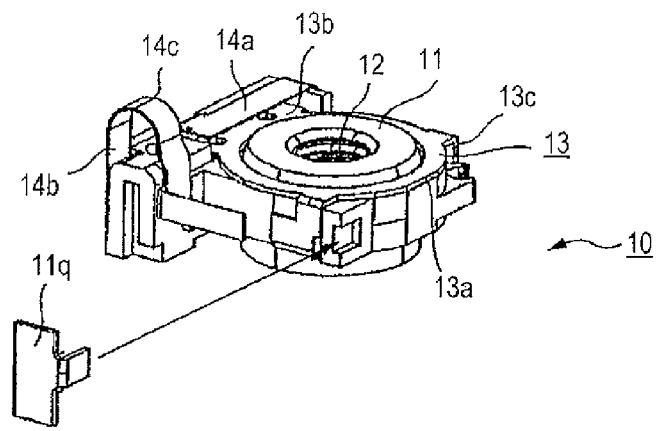
FIG. 4 is a perspective view showing a state in which an RF plate is attached to the lens assembly shown in FIG. 2.
Figure 5:
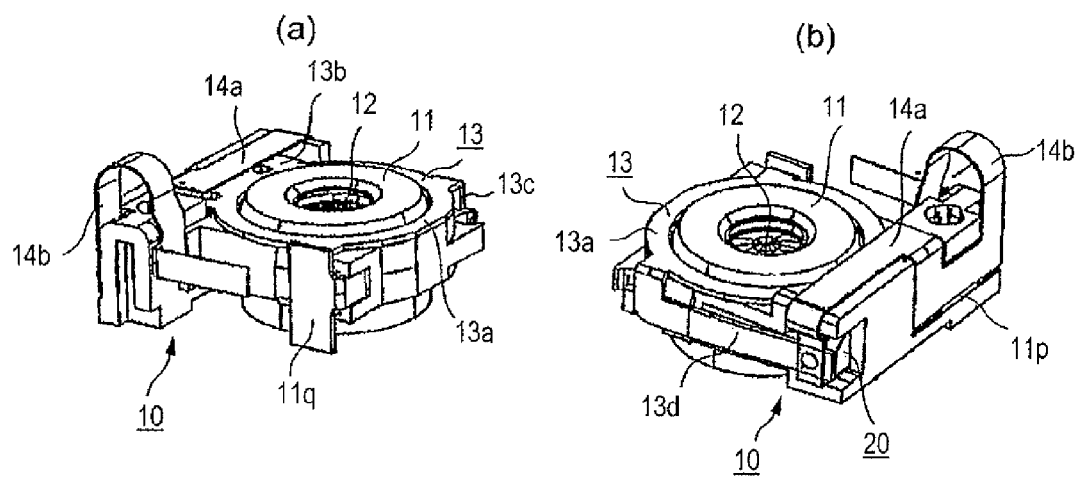
FIG. 5 is a perspective view showing the lens assembly (the second lens assembly) for use in Example 1 of the present invention, and (a) and (b) are perspective views viewed from separate angles, respectively.
Figure 6:
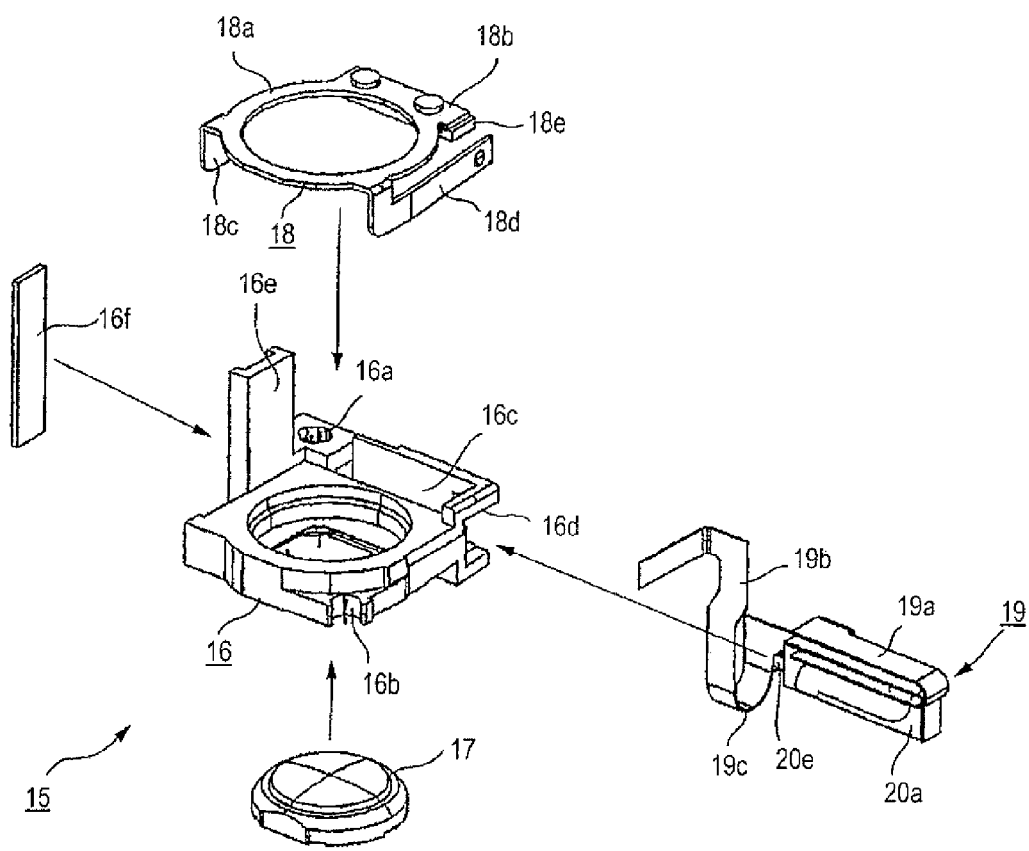
FIG. 6 is an exploded perspective view showing a lens assembly (a second lens assembly) for use in Example 1 of the present invention.

Constitutions of the first lens assembly 10 and the second lens assembly 15 are shown in FIG. 5 (the first lens assembly 10) and FIG. 6 (the second lens assembly 15), respectively. Furthermore, details of the first lens assembly 10 are shown in FIGS. 1, 2 and 4. FIG. 3 is an explanatory view of an operation principle of a piezo element 20 to be incorporated in each of the lens assemblies 10, 15.

Figure 9:
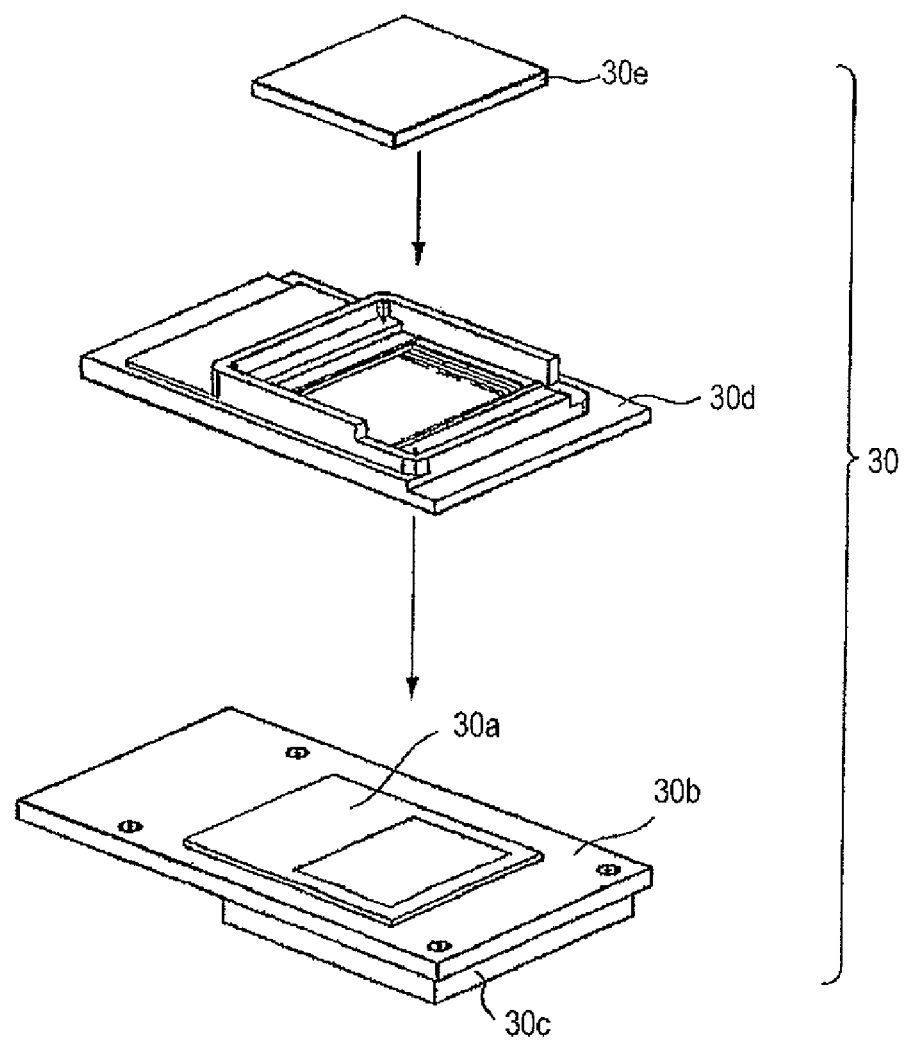
FIG. 9 is an exploded perspective view showing one example of a CCD assembly for use in the camera module according to Example 1 of the present invention.
Figure 10:
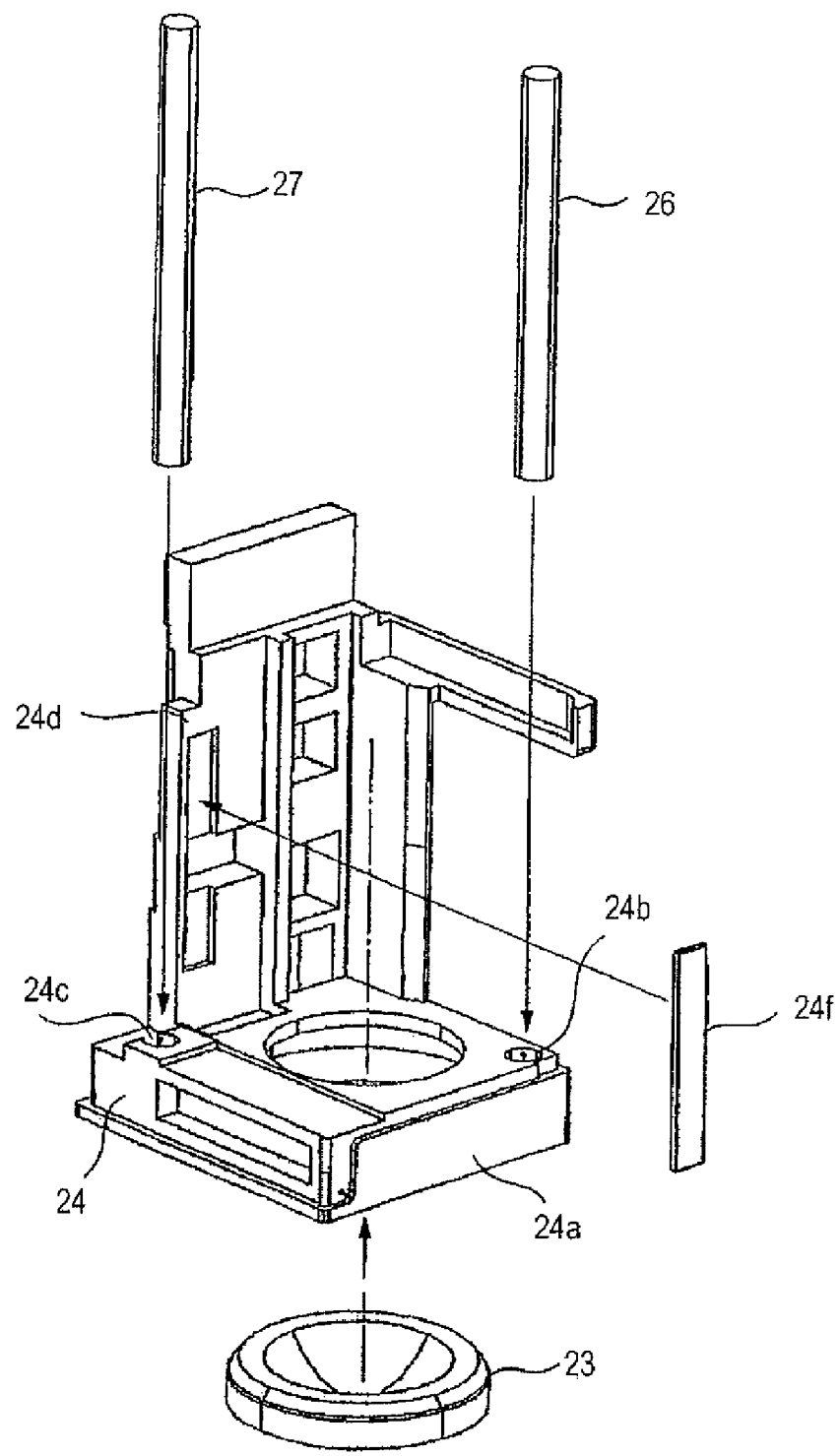
FIG. 10 is a perspective view showing a state in which an optical lens, a guide shaft and a driving shaft are attached to a case.
Figure 11:
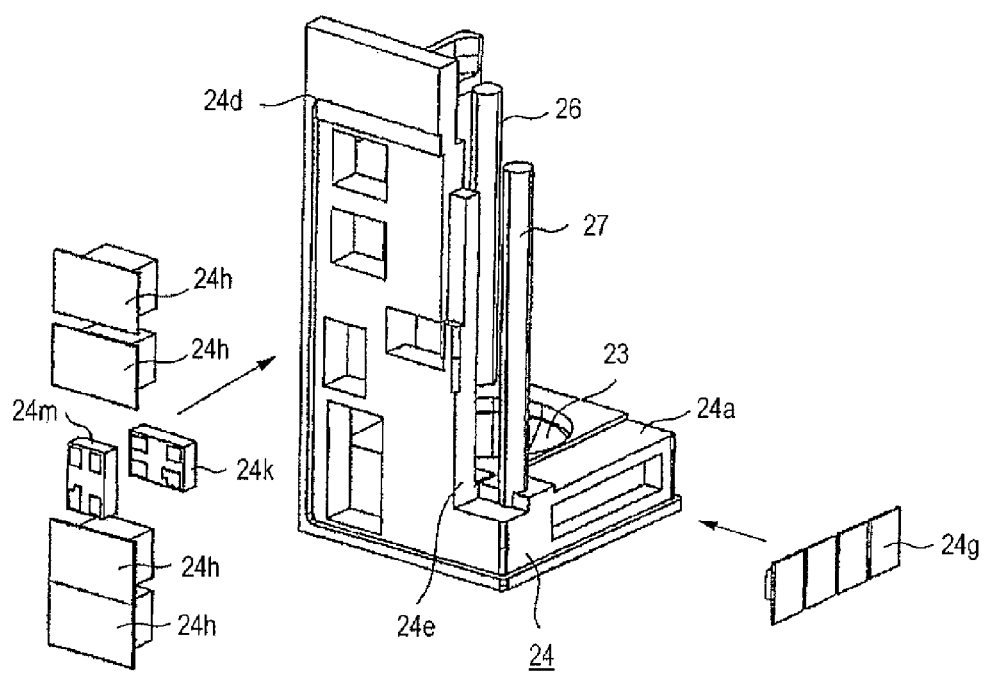
FIG. 11 is a perspective view showing a state in which electrical components are attached to the case.
Figure 12:
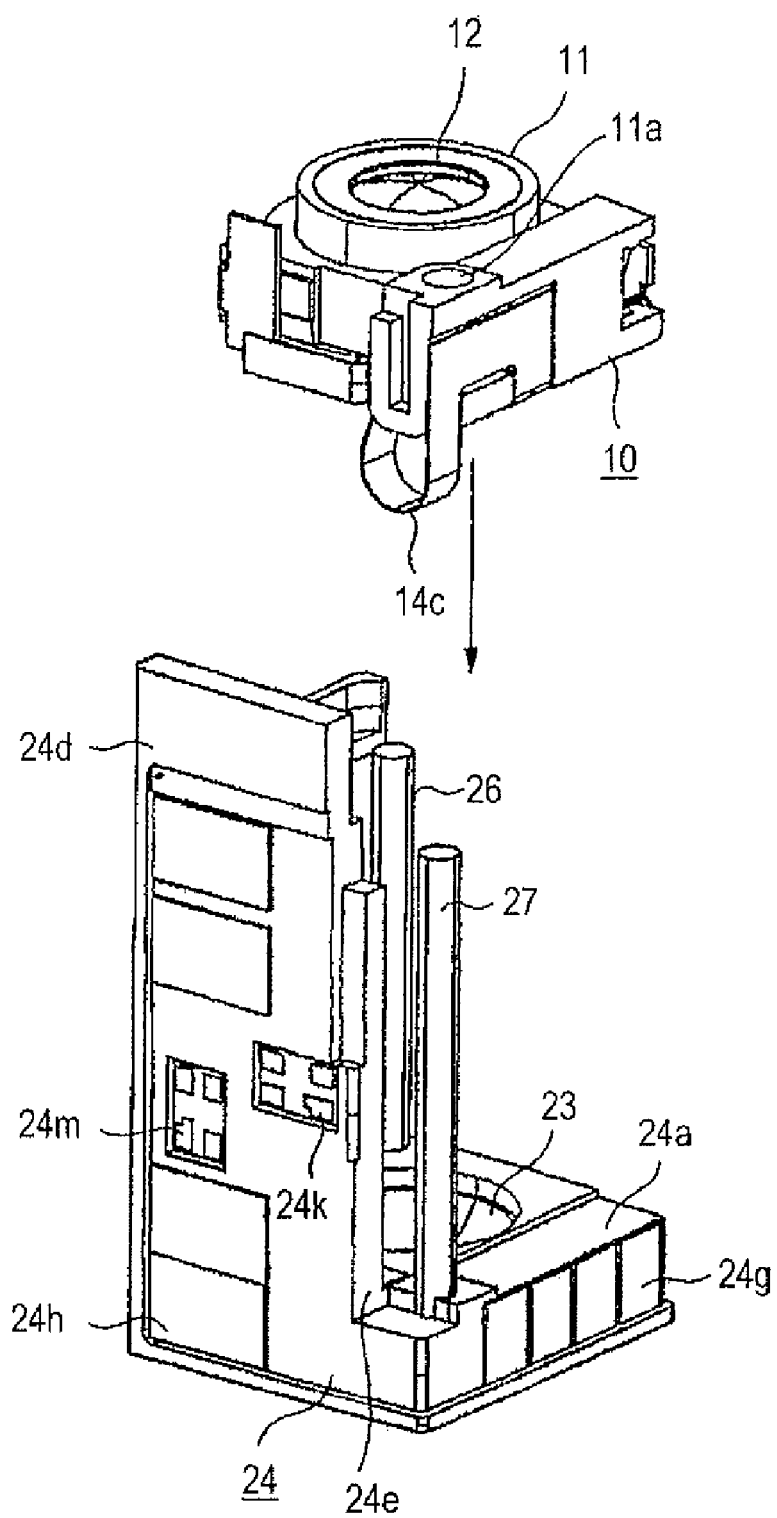
FIG. 12 is a perspective view showing a state in which the second lens assembly is attached to the guide shaft and the driving shaft.
Figure 13:
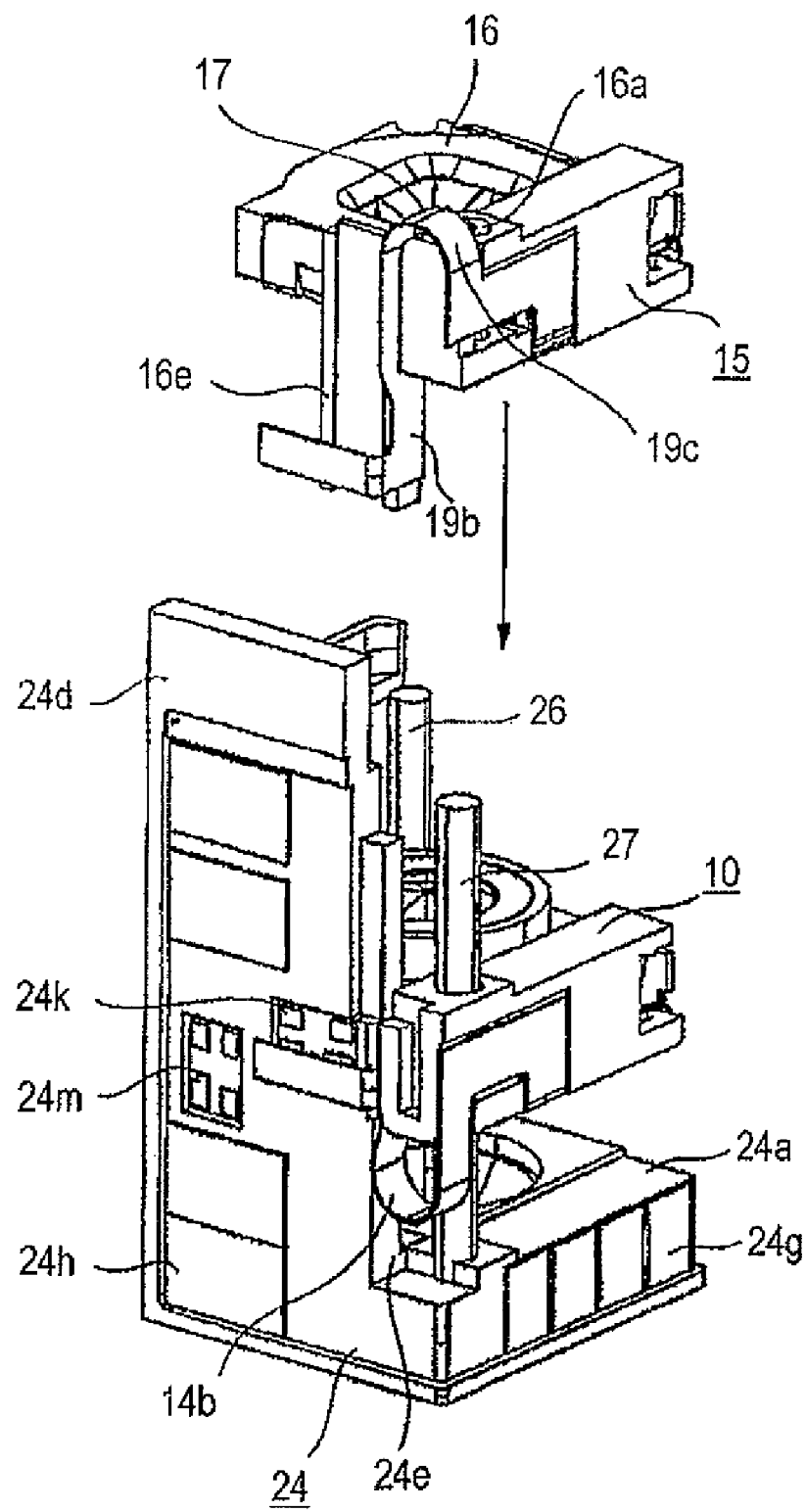
FIG. 13 is a perspective view showing a state in which the first lens assembly is attached to the guide shaft and the driving shaft.
Figure 14:
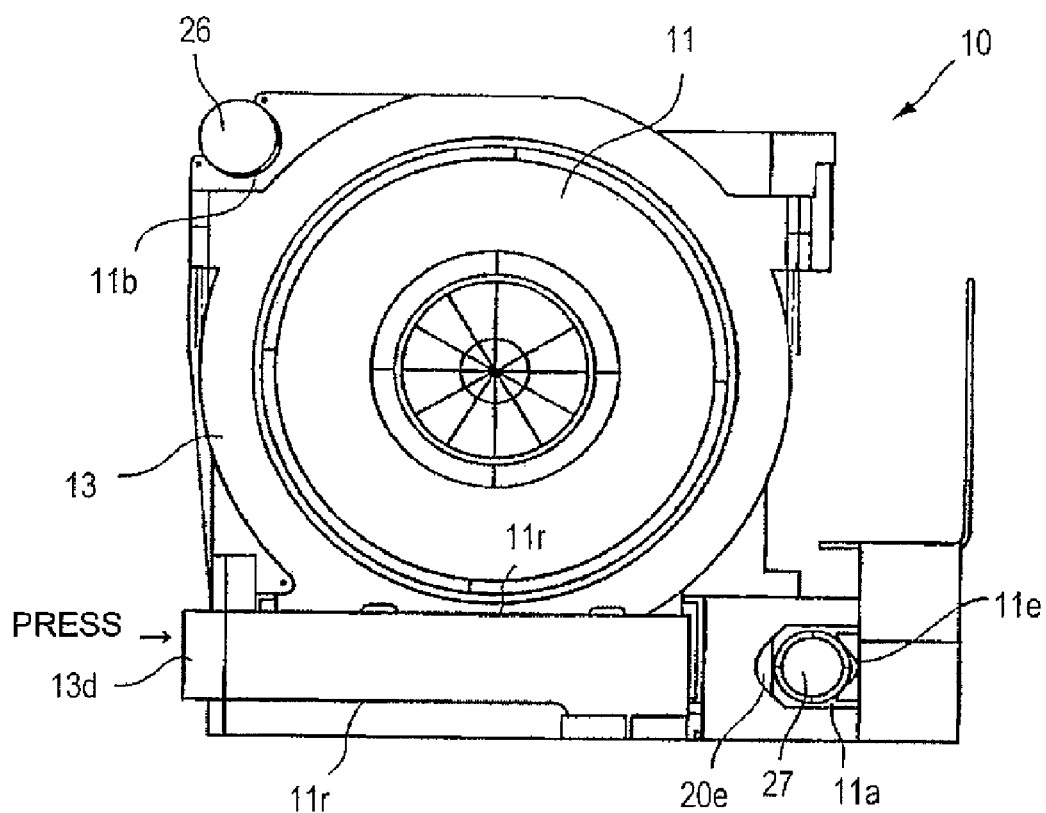
FIG. 14 is a plan view showing a state in which the second lens assembly is attached to the guide shaft and the driving shaft.
Figure 15:
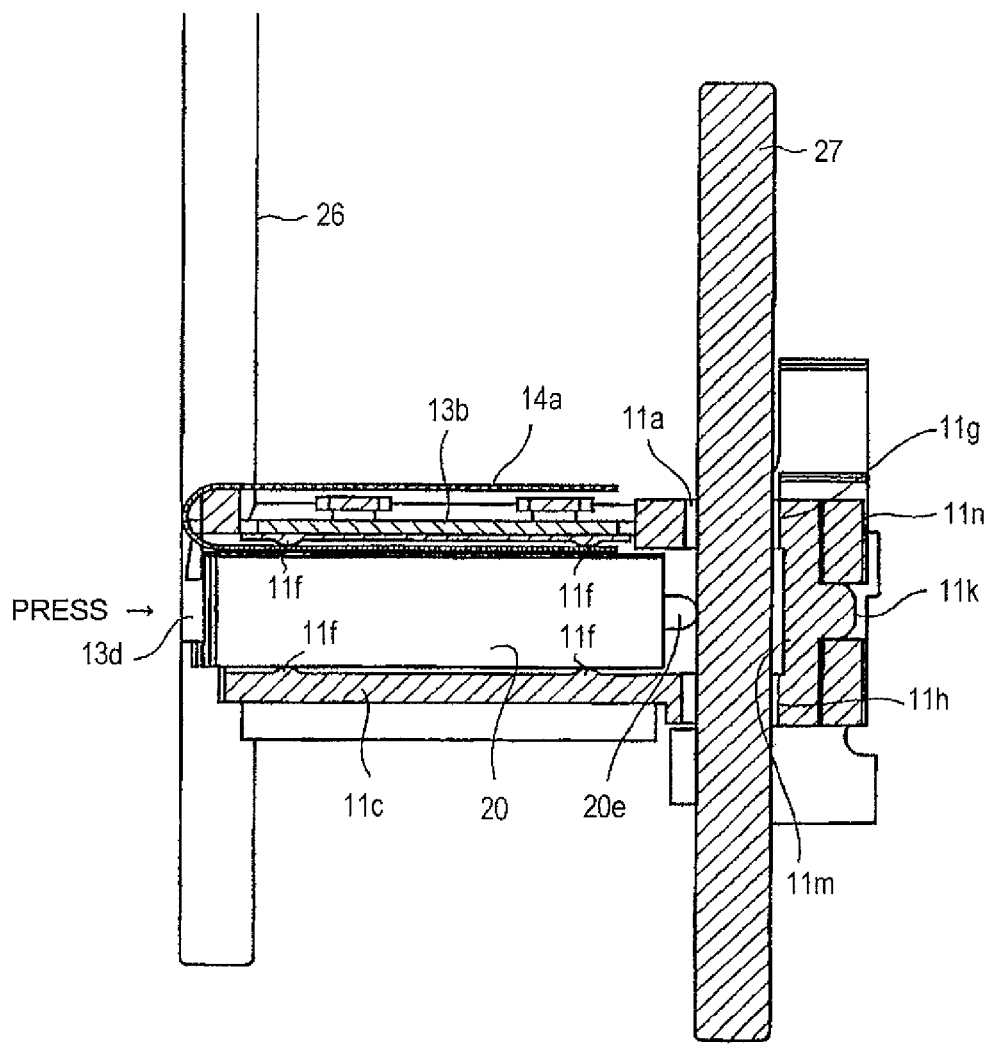
FIG. 15 is a sectional view of FIG. 14.
Figure 16:
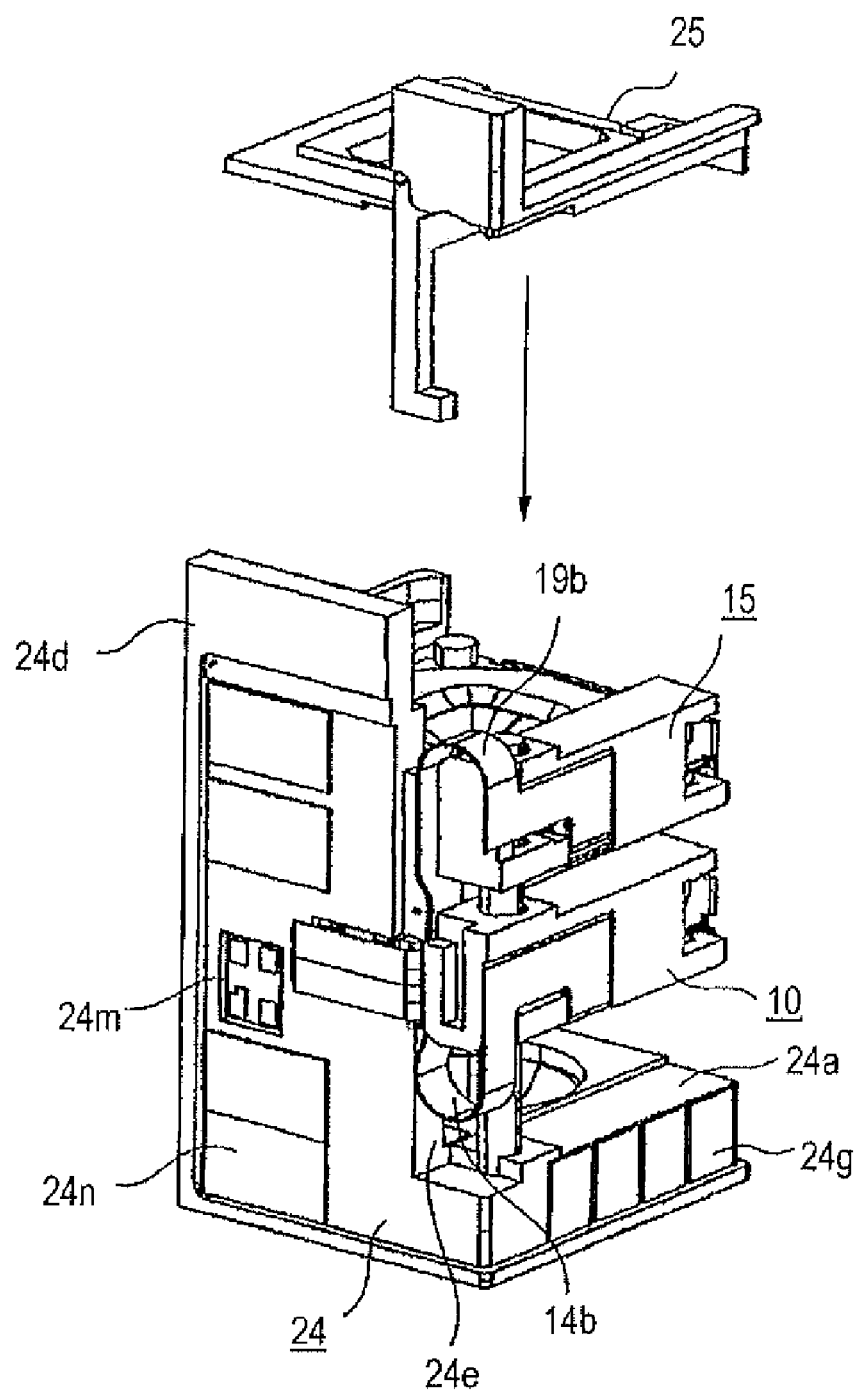
FIG. 16 is a perspective view showing a state in which a bottom cover is attached.
Figure 17:
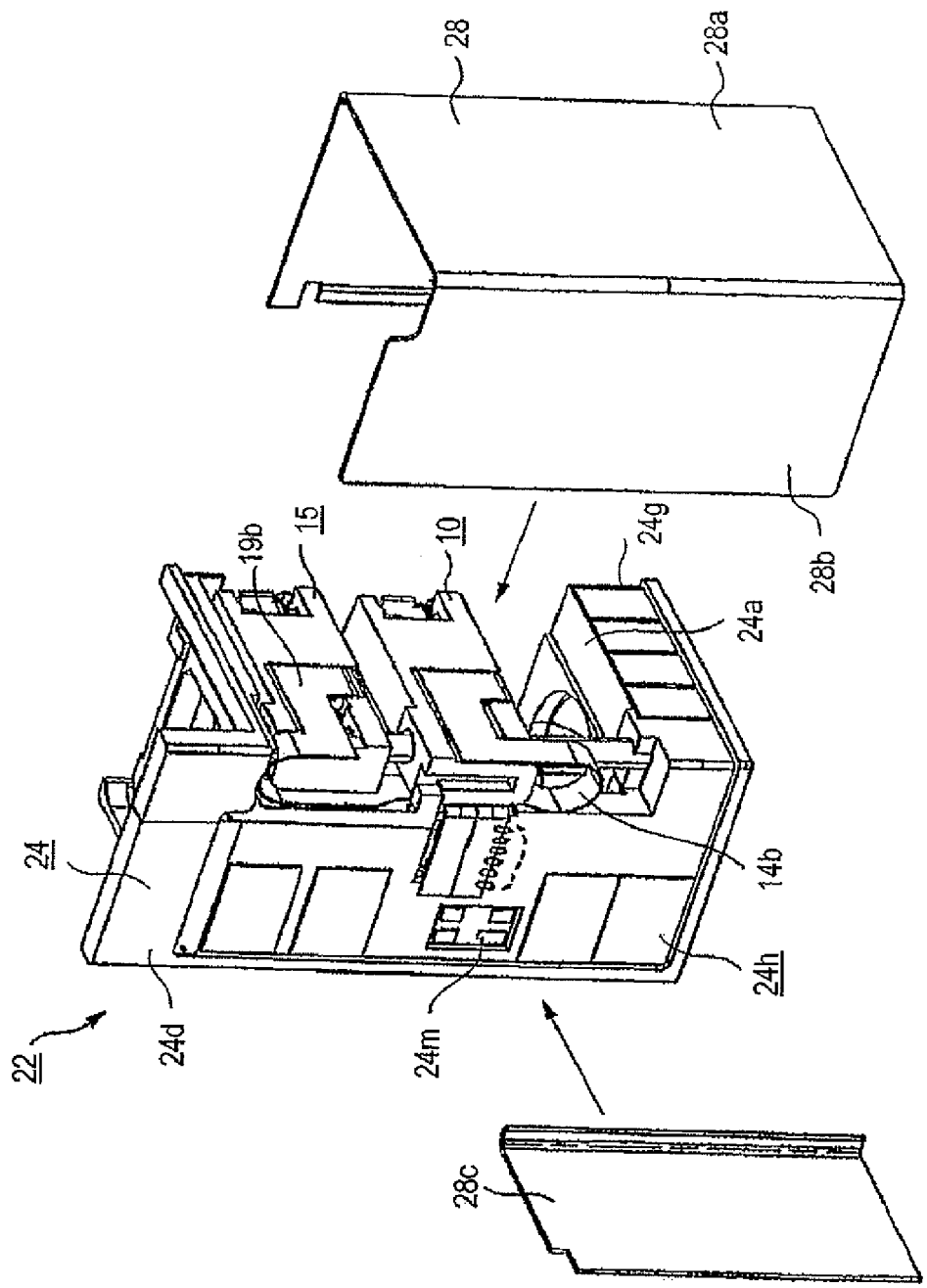
FIG. 17 is a perspective view showing a state in which a side cover is attached.
Figure 18:
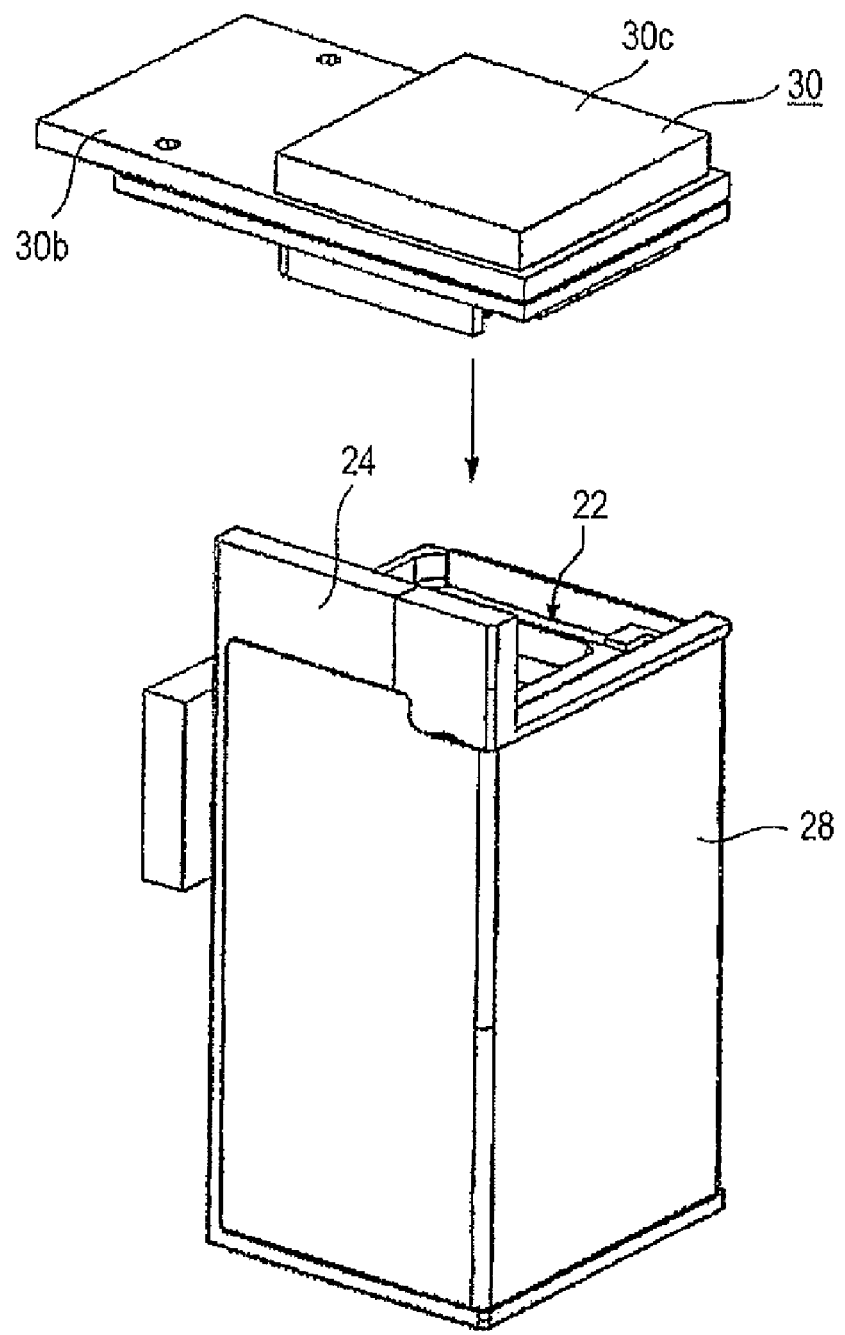
FIG. 18 is a perspective view showing a state in which a CCD assembly is attached.

Furthermore, in order to describe a constitution of this camera module 21, constituting elements are successively shown in exploded perspective views of FIGS. 9 to 18. FIG. 9 is an exploded perspective view showing one example of the CCD assembly 30; FIG. 10 is a perspective view showing a state in which the optical lens 23, a guide shaft 26 and a driving shaft 27 are attached to the case 24; FIG. 11 is a perspective view showing a state in which electrical components are attached to the case 24; FIG. 12 is a perspective view showing a state in which the first lens assembly 10 is attached to the guide shaft 26 and the driving shaft 27; and FIG. 13 is a perspective view showing a state in which the second lens assembly 15 is attached to the guide shaft 26 and the driving shaft 27. FIG. 14 is a plan view showing a state in which the first lens assembly 10 is attached to the guide shaft 26 and the driving shaft 27; FIG. 15 is a sectional view of substantially the center of the piezo element 20 and the driving shaft 27 of FIG. 14; FIG. 16 is a perspective view showing a state in which a bottom cover (a lower cover) 25 is attached; FIG. 17 is a perspective view showing a state in which side covers 28, 28c are attached; and FIG. 18 is a perspective view showing a state in which the CCD assembly 30 is attached.

Figure 19:
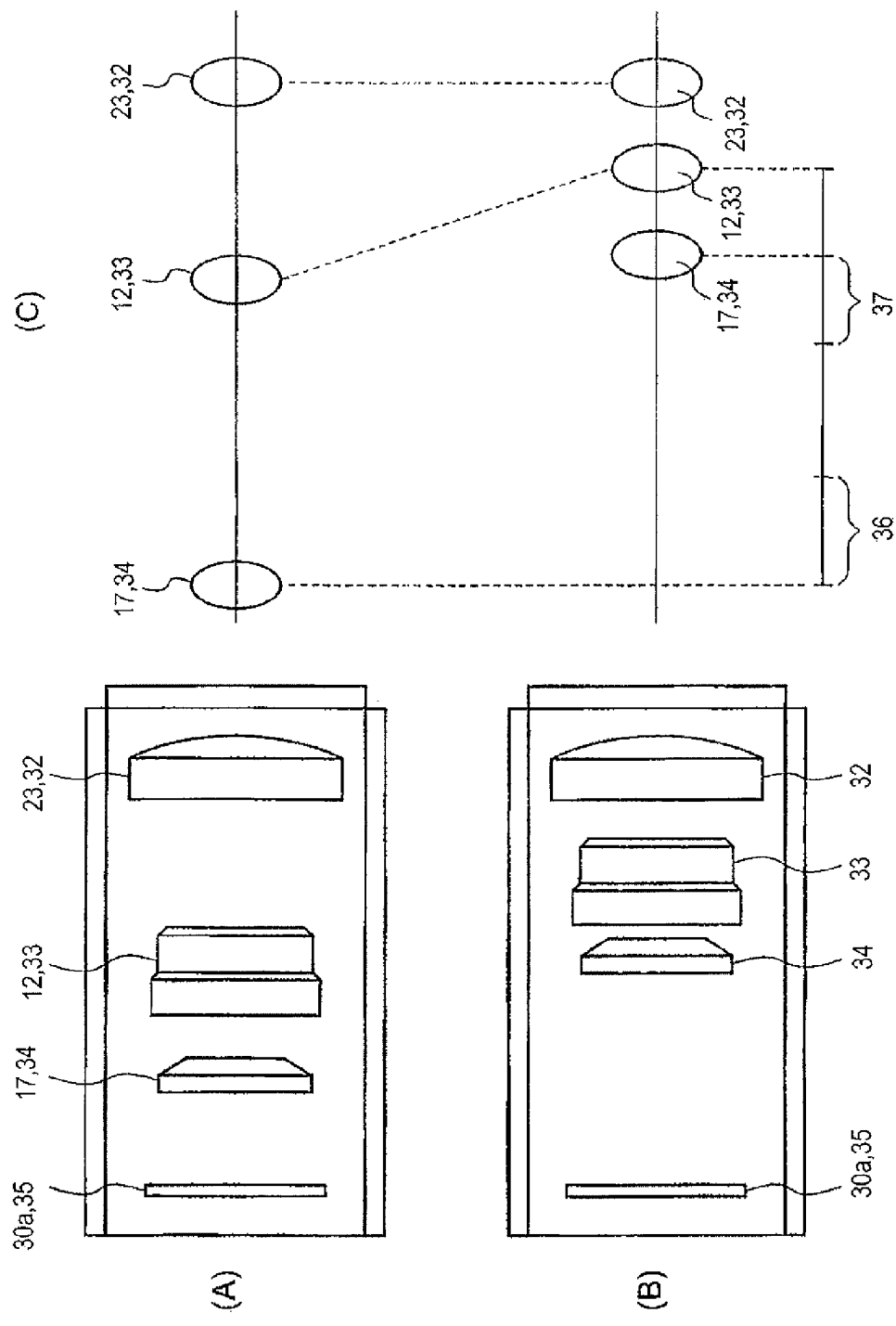
FIG. 19 shows a diagram (A) of a state in which lenses constituting an optical system of the camera module of the embodiment are arranged at a wide-angle (wide) position, a diagram (B) of a state in which the lenses are arranged at a telephoto (tele)position, and a diagram (C) showing movable ranges of a focusing lens at the telephoto (tele)position and the wide-angle (wide) position.

Moreover, FIG. 19 shows a diagram (A) of a state in which an optical system is disposed at a wide-angle (wide) position, a diagram (B) of a state in which the system is disposed at a telephoto (tele)position, and a diagram (C) showing movable ranges of a focusing lens at the telephoto (tele)position and the wide-angle (wide) position. The system is constituted of a lens 12 to be incorporated in the first lens assembly 10 of the camera module 21 of the embodiment constituting Example 1 shown in FIGS. 1 to 18, a lens 17 to be similarly incorporated in the second lens assembly 15, the lens 23 to be incorporated in the holder section 24a on the subject side, and a CCD 30a as an image pickup element; and a first lens unit 32 held by a third lens holding unit 41 on the subject side, a second lens unit 33 held by a second lens holding unit 42, a third lens unit 34 held by a first lens holding unit 44, and an image pickup element 35 in Examples 2 to 5 shown in FIGS. 20 to 33; and the like. Each of the lens units 23, 32 on the subject side, the focal length changing lens units 12, 33 arranged on the sides of the image pickup elements 30a, 35 and the focal length changing and focusing (focus adjustment) lens units 17, 34 arranged on the side of the image pickup element 35 is constituted of at least one or more optical lenses as shown in FIGS. 19(A), (B). When the lens units 12, 33 and the lens units 17, 34 move toward the image pickup elements 30a, 35 using a CCD and the like with respect to the lens units 23, 32 having positions fixed as shown in FIG. 19(A), the wide-angle position is reached. When the lens units 12, 33 and the lens units 17, 34 are brought close to the lens units 12, 32 as shown in FIG. 19(B), the telephoto position is reached.

Moreover, as shown in FIG. 19(C) showing the positions of the lens units and the movable ranges for the focusing in accordance with the lens unit positions shown in FIGS. 19(A), 19(B), for example, the lens units 17, 34 for the focusing move in a range denoted with 36 in FIG. 19(C) in the wide-angle (wide) position of FIG. 19(A), and move in a range denoted with 37 in FIG. 19(C) in the telephoto (tele) position of FIG. 19(B) to perform the focusing (focus adjustment).

The camera modules of the embodiments shown in FIGS. 7, 8, 20, 27, 31 and 33 realize the movements of the stored lens units by use of the piezo element 20 shown in FIG. 3. In FIG. 3, (A) is a perspective view of the piezo element for use in the camera module of the embodiment, (B) shows the constitution of the piezo element, and (C) is an explanatory view of the operation principle. In the piezo element 20 for use herein, as described in detail in Patent Documents 6 to 11, a first surface 20b of the piezoelectric ceramic (the piezo element) 20 formed into a substantially rectangular plate-like outer shape in a longitudinal direction and a short direction in FIG. 3(A) is provided with four electrodes 20n, 20p, 20q and 20r as shown in FIG. 3(B), and the whole second surface 20c on an opposite side is provided with one electrode. Moreover, it is preferable that in the electrodes 20n, 20p, 20q and 20r of the first surface 20b, the diagonally arranged electrodes 20n and 20p, and 20q and 20r are electrically connected to each other by wires 20s and 20t arranged in the vicinities of connecting portions of the electrodes, respectively, and the electrode on the second surface 20c is grounded.

Moreover, on a third surface 20d in the short direction, the spacer 20e which is the operating portion of a comparatively hard ceramic is preferably attached to the vicinity of the center of the side by, for example, an adhesive, and engaged with an object 20v to be relatively moved. Furthermore, as shown in FIG. 3(B), this piezoelectric ceramic (the piezo element) 20 is deformably supported by a pair of supports 20f, 20g and supports 20h, 20k and 20m provided with springs, which are fixed to a periphery of the ceramic.

When a positive voltage is applied to the electrodes 20n, 20r and a negative voltage is applied to the electrodes 20p, 20q in the piezoelectric ceramic (the piezo element) 20 constituted as mentioned above, as exaggeratedly shown in FIG. 3(C), the piezoelectric ceramic (the piezo element) 20 is longer on the left side than on the right side in the drawing.

Since the ceramic is supported by the supports 20h, 20k and 20m provided with the springs, the ceramic can be deformed. Therefore, the ceramic moves toward the right of the object 20v with which the spacer 20e engages. Moreover, when any voltage is not applied, the piezoelectric ceramic (the piezo element) 20 returns to an original state. At this time, for example, in a case where an asymmetric voltage pulse having a falling time which is at least about four times longer than a rising time is applied to the electrodes, when a pulse falls, the spacer 20e engaged with the object 20v returns to a departure position of the spacer 20e owing to a friction between the spacer 20e and the object 20v in the piezoelectric ceramic (the piezo element) 20. Therefore, the spacer 20e and the object 20v relatively move as much as a displacement at a time when the pulse rises. It is to be noted that when the voltage is applied in reverse, this piezoelectric ceramic (the piezo element) 20 deforms in a reverse direction. Therefore, the spacer 20e and the object 20v relatively move in the reverse direction.

When such a signal voltage as to continuously cause the deformation shown in FIG. 3(C) is applied to the piezoelectric ceramic (the piezo element) 20 in this manner, a relative position of the ceramic with respect to the object 20v is displaced owing to the friction between the spacer 20e and the object 20v. Therefore, the ceramic constitutes a driving source having advantages that the source operates at a low speed but has a high torque and excellent response and controllability, can finely be positioned, has a holding torque (or a holding force) when not energized, has excellent quietness and is small and light.

FIG. 1 is a perspective view showing a lens holder (a first lens holding unit) for use in the camera module according to Example 1 of the present invention together with an optical lens. As shown, an optical lens storage space is defined in the lens holder 11 (the first lens holding unit), and at least one optical lens 12 is held in this optical lens storage space. The lens holder 11 is formed into a substantially square shape as viewed from above, and a bearing section 11a and a guide bearing section 11b as a first bearing section extending upwards from a lower part of the drawing are formed in a pair of corner portions facing each other. A driving element holding section (A piezo element holding section) 11c is formed into which a driving element 14 described later is to be inserted along a side of the bearing section 11a. Moreover, as not shown in FIG. 1, this piezo element holding section 11c is provided with an inserting portion (a hole) which communicates with the bearing section 11a.

Description will be provided with reference to FIG. 2. As described above, after the optical lens 12 is attached to the lens holder 11, the driving element 14 is disposed in the piezo element holding section 11c. The driving element 14 has the substantially rectangular plate-like piezo element 20 described above with reference to FIG. 3. This piezo element 20 is provided with the electrodes (not shown) on the first surface 20b formed in the longitudinal direction and the short direction and the second surface 20c opposite to the first surface. Moreover, the third surface 20d in the short direction is provided with the spacer (the operating portion) 20e to be engaged with the object to be relatively moved. Sine-waveform-like voltages are applied to the electrodes arranged on the first surface 20b and the second surface 20c to thereby generate a reciprocating movement in the operating portion 20e. In consequence, the operating portion 20e realizes the relative movement with respect to the engaged object.

A two-forked leaf spring member 14a is formed on an upper surface of the piezo element 20, and the piezo element 20 is further connected to the wiring member (the flexible wiring line) 14b. Furthermore, this wiring member 14b is turned back at a return portion denoted with reference numeral 14c, and this return portion 14c is positioned on the subject side of the lens holder 11 as described later.

As shown in FIGS. 1 and 2, the surface of the piezo element holding section 11c opposite to the bearing section 11a is opened. Moreover, an upper surface is also opened, and a partition portion lid is disposed to separate this opposite surface from the upper surface. As shown by a solid-line arrow in FIG. 2, when the piezo element 20 is inserted into the piezo element holding section 11c from an operating portion 20e side, the piezo element 20 is inserted into the piezo element holding section 11c in a state in which the leaf spring member 14a steps over the partition portion 11d. Moreover, the operating portion 20e passes through an inserting section and is opposed to the bearing section 11a.

Subsequently, the fixing member 13 is attached to the lens holder 11 from a direction shown by a solid-line arrow in FIG. 2. This fixing member 13 has an elastic force, and includes an annular main body portion 13a, and this main body portion has a first press portion 13b, an engagement piece portion 13c and a second press portion 13d extending like an arm. Moreover, when the fixing member 13 is attached to the lens holder 11, the leaf spring member 14a is pressed downwards by the first press portion 13b, and a rear end (an end opposite to the operating portion 20e) of the piezo element 20 is pressed toward the bearing section 11a by the second press portion 13d. Furthermore, the engagement piece portion 13c is engaged with the lens holder 11 to engage the main body portion 13a with the lens holder 11. In this case, the fixing member 13 prevents falling of the optical lens 12 attached to the lens holder 11. It is to be noted that the fixing member 13 may be molded of a conductive material, and an insulating member 13e may be disposed in a position facing the side surface of the piezo element 20.

Description will be provided with reference to FIG. 4. After assembling the lens assembly (the first lens assembly) 10 as described with reference to FIG. 2, an RF plate 11q is attached to the lens holder 11. FIGS. 5(a) and (b) are perspective views showing the lens assembly 10 to which the RF plate 11q has been attached as viewed from separate angles, respectively. The lens holder 11 is provided with a groove portion 11p which positions the wiring member 14b, a part of the wiring member 14b is stored in this groove portion 11p, and the wiring member 14b is positioned. It is to be noted that a sensor tape (not shown) which is a member for position to be detected is attached to the lens holder 11.

Description will be provided with reference to FIG. 6. FIG. 6 is an exploded perspective view of the lens assembly (the second lens assembly) 15. This lens assembly 15 has a lens holder 16 (a second lens holding unit), and this lens holder 16 has a structure similar to that of the lens holder 15 except a raised portion 16e. That is, an optical lens storage space is defined in the lens holder 16, and at least one optical lens 17 is held in this optical lens storage space. Moreover, the lens holder 16 is provided with a bearing section 16a and a guide bearing section 16b extending upwards from a lower part of the drawing in a pair of corner portions of the lens holder 16 facing each other. A driving element holding section (a piezo holding section) 16c is formed into which a driving element 19 described later is to be inserted along a side of the bearing section 16a. Furthermore, although not shown in FIG. 6, this piezo holding section 16c is provided with an inserting portion which communicates with the bearing section 16a.

As described with reference to FIGS. 1 and 2, after the optical lens 17 is attached to the lens holder 16, the driving element 19 is disposed in the piezo element holding section 16c. The driving element 19 has a piezo element 20a similar to the piezo element 20, a two-forked leaf spring member 30 is formed on an upper surface of the piezo element 20a, and the piezo element 20a is further connected to a wiring member (a flexible wiring line) 19b. Furthermore, this wiring member 19b is turned back at a return portion denoted with reference numeral 19c, and this return portion 19c is positioned on an image forming side of the lens holder 16 as described later.

As shown in FIG. 6, the surface of the piezo element holding section 16c opposite to the bearing section 16a is opened. Moreover, an upper surface is also opened, and a partition portion 16d is disposed to separate this opposite surface from the upper surface. As shown by a solid-line arrow in FIG. 6, when the piezo element 20a is inserted into the piezo element holding section 16c from an operating portion 20e side, the piezo element 20a is inserted into the piezo element holding section 16c in a state in which the leaf spring member 19a steps over the partition portion 16d. Moreover, the operating portion 20e passes through an inserting section and is opposed to the bearing section 16a.

Subsequently, the fixing member 18 is attached to the lens holder 16 from a direction shown by a solid-line arrow in FIG. 6. This fixing member 18 has a structure similar to that of the fixing member 13, and includes an annular main body portion 18a, and this main body portion 18a has a first press portion 18b, an engagement piece portion 18c and a second press portion 18d extending like an arm. Moreover, when the fixing member 18 is attached to the lens holder 16, the leaf spring member 19a is pressed downwards by the first press portion 18b, and a rear end (an end opposite to the operating portion 20e) of the piezo element 20a is pressed toward the bearing section 16a by the second press portion 18d. Furthermore, the engagement piece portion 18c is engaged with the lens holder 16, and the main body portion 18a is engaged with the lens holder 16. In this case, the fixing member 18 prevents falling of the optical lens 17 attached to the lens holder 16. This lens holder 16 is provided with the raised-portion 16e, and a sensor tape 16f for position to be detected is attached to this raised portion 16e. It is to be noted that the fixing member 18 may be molded of a conductive material, and an insulating member 18e may be disposed in a position facing the side surface of the piezo element 20a.

FIGS. 7, 8 are perspective views showing appearances of the camera module according to Example 1 of the present invention in which the first lens assembly 10 and the second lens assembly 15 constituted as described above are incorporated, FIG. 7 is a perspective view showing a CCD assembly 30 side of this camera module 21 which is an upper side of the drawing, and FIG. 8 is a perspective view showing a holder section 24a side which is an upper side including the lens 23 incorporated therein.

In FIG. 7, the image forming side is an upper side, and the ASIC (Application Specific Integrated Circuit: the third wiring member) 29 which connects the wiring member 14b in the first lens assembly 10 and the wiring member 19b in the second lens assembly 15 to the CCD assembly 30 is disposed on a side surface of the camera module housing 22 as shown in FIG. 8 (this ASIC 29 is also connected to position detecting sensors 24k and 24m described later). In the drawing, reference numeral 24 is the case and 28 is the side cover (the shield cover).

FIG. 9 is an exploded perspective view showing one example of an image pickup element assembly (an image pickup unit) for use in the camera module according to Example 1 of the present invention. As shown, the CCD 30a which is an image pickup element is mounted on one surface of a CCD substrate 30b, and a digital signal processor (DSP) 30c is mounted so as to face the CCD 30a on the other surface of this CCD substrate 30b. The CCD substrate 30b is covered with a CCD cover 30d from a CCD 30a side, and an infrared ray (IR) interrupting filter 30e is attached to an open surface of the CCD cover 30d to constitute the image pickup element assembly (hereinafter referred to as the CCD assembly) 30.

Description will be provided with reference to FIG. 10. FIG. 10 is a perspective view showing a case (an upper case) 24 of the camera module. The case 24 is constituted so that the holder section 24a positioned on the subject side is a lower side, and the optical lens 23 is disposed in a lens storage spade formed in the holder section 24a as shown by a solid-line arrow. An upper surface of the holder section 24a is provided with bearing sections 24b and 24c into which the guide shaft 26 and the driving shaft 27 are to be inserted, and one end of the guide shaft 26 and one end of the driving shaft 27 are inserted into these bearing sections 24b and 24c, respectively. It is to be noted that the case 24 has a raised wall 24d integrally formed with the holder section 24a, and a sensor tape 24f is attached to this raised wall 24d.

Description will be provided with reference to FIG. 11. As shown, four capacitors 24g are attached to the side surface of the holder section 24a (two of the capacitors 24g are used for driving the piezo element 20, and two remaining capacitors are used for driving the piezo element 20a). A cutout portion 24e is formed in one side of the raised wall 24d, and four inductors 24h are attached to the raised wall 24d (two of the inductors 24h are used for driving the piezo element 20, and two remaining capacitors are used for driving the piezo element 20a). Moreover, the position detecting sensor 24k for the lens assembly 10 and the position detecting sensor 24m for the lens assembly 15 are attached to the raised wall. That is, a storage portion to store electrical elements is formed in the raised wall 24d.

Subsequently, description will be provided with reference to FIG. 12. The bearing section 11a of the first lens assembly 10 is inserted into the driving shaft 27 so that the return portion 14c turns to the subject side, that is, a holder section 24a side, and the bearing section 11b (not shown) is inserted into the guide shaft 26. FIG. 13 is a diagram showing a state in which the first lens assembly 10 is inserted into the driving shaft 27 and the guide shaft 26. The second lens assembly 15 is attached subsequently to the attaching of the lens assembly 10. Moreover, the wiring members 14b and 19b are positioned in the cutout portion 24e (see FIG. 16 also).

Description will be made with reference to FIGS. 14 and 15. FIG. 14 is a plan view after the first lens assembly 10 is attached to, and FIG. 15 is a sectional view of the assembly. As shown in FIG. 14, the surface of the bearing section 11a facing the operating portion 20e of the piezo element 20 is a V-shaped groove 11e, and the driving shaft 27 abuts on this V-shaped groove 11e. That is, an outer peripheral surface of the driving shaft 27 abuts on the operating portion 20e of the piezo element 20 in a first place, and abuts on the V-shaped groove 11e in a second place, and the driving shaft 27 is slid in this second place. In this case, left and right side surfaces (upper and lower surfaces in FIG. 14) of the piezo element 20 are guided by a pair of fixed walls 11r of the piezo element holding section 11c. Moreover, surface processing of the walls differs with the first and second places. For example, the surface of the second place is treated to be smoother than the surface of the first place (i.e., the surface of the first place is treated to be rougher than that of the second place). As a result, a frictional coefficient of the second place is smaller than that of the first place. Furthermore, only the surface of the second place may be subjected to a lubrication treatment.

It is to be noted that the V-shaped groove 11e may be formed in two upper and lower places as shown by 11g, 11h in FIG. 15, and the operating portion 20e may be allowed to abut on the driving shaft 27 between the two V-shaped grooves. The guide shaft 26 may be subjected to the same surface treatment as that of the driving shaft 27.

As described above, a rear end of the piezo element 20 is pressed by the second press portion 13d. As a result, the operating portion 20e abuts on an outer peripheral surface of the driving shaft 27, and the driving shaft 27 abuts on the V-shaped groove 11e. As shown in FIG. 15, pairs of protruding portions 11f are formed at predetermined intervals on fixed walls (upper and lower surfaces in the drawing) of the piezo holding section 11c. The piezo element 20 is pressed downwards in the drawing by the first press portion 13b via the leaf spring 14a, and sandwiched between the protruding portions 11f. On the other hand, as described above, the rear end of the piezo element 20 is pressed toward the driving shaft 27 side by the second press portion 13d, and the operating portion 20e abuts on the outer peripheral surface of the driving shaft 27. That is, as shown in FIG. 15, upper, lower and side surfaces of the piezo element 20 in the drawing are deformably pressed and held by the protruding portions 11f formed at two places, respectively. An end portion of the piezo element 20 opposite to the operating portion 20e is pressed onto the driving shaft 27 by the second press portion 13d which is urging means. It is to be noted that the protruding portions 11f are formed at positions where vibration node portions of the piezo element 20 are pressed. Moreover, the driving shaft 27 abuts on an abutment member 11m having the first abutment portion 11g and the second abutment portion 11h, and this abutment member 11m abuts on and is held by an abutment member 11n via an abutment portion 11k.

When the lens assembly 10 is attached to the driving shaft 27 and the guide shaft 26 as described above, the operating portion 20e of the piezo element 20 abuts on the driving shaft 27. Subsequently, as shown in FIG. 13, the bearing section 16a is inserted into the driving shaft 27 and the guide bearing section 16b is inserted into the guide shaft 26 so that the return portion 19c of the second lens assembly 15 is directed toward an image forming side (i.e., a side opposite to the holder section 24a). It is to be noted that the bearing section 16a is constituted in the same manner as in the bearing section 11a. When the second lens assembly 15 is attached to the driving shaft 27 and the guide shaft 26, the operating portion 20e of the return portion 19c abuts on the driving shaft 27.

It is to be noted that in the above example, the surface of the bearing section 11a brought into contact with the driving shaft 27 is molded into a V-shape, and the bearing section 11b is formed in accordance with an outer shape of the guide shaft 26. However, for example, the surface of the bearing section 11a brought into contact with the driving shaft 27 and the bearing section 11b may be constituted using a roller formed into the V-shape. In this case, as shown in an example of FIGS. 30(a) to (c), cylindrical flat rollers 54d, 54e may be stored in the bearing section so that the rollers form a V-shape with respect to the guide shaft 26 (in FIGS. 30(a) to (c), the bearing section 11b is represented by a bearing section 54a, and the guide shaft 26 is represented by a shaft member 46).

FIG. 30(a) is a plan view of this bearing section 54a, and FIGS. 30(b) and (c) are a side view and a perspective view of the bearing section 54a. The flat rollers 54d and 54e are held so as to form the V-shape with respect to the shaft member 46 by U-shaped bearings 54b in a V-shaped cut 54f disposed in this bearing section 54a. In a case where the bearing section 54a is constituted in this manner, even if manufacturing errors are generated in first and second lens holders and a position of the bearing section deviates from a normal position owing to thrust rattles in the flat rollers 54d and 54e crossing each other at right angles, the shaft member 46 is allowed to abut on a V-shaped valley formed at a time when the flat rollers 54d and 54e are allowed to cross each other at right angles. In consequence, the thrust rattles of the flat rollers 54d and 54e do not influence optical axes of the first and second lens holders.

As described above, after attaching the lens assembly 15, as shown in FIG. 16, the bottom cover (the lower cover) 25 is attached to the case 24 from the image forming side. In this bottom cover 25, bearing sections (not shown) are formed into which the guide shaft 26 and the driving shaft 27 are to be inserted. Furthermore, as shown in FIG. 17, the side covers (the shield covers) 28 and 28c are attached to the case 24 to constitute the camera module housing 22. As a result, the piezo elements 20 and 19 are positioned on a surface 28a (hereinafter referred to as the first side surface) side of the side cover 28 constituting the camera module housing 22. Moreover, when a side surface adjacent to the first side surface 28a is referred to as a second side surface 28b, the sensor tape 24f and the position detecting sensors 24k and 24m (see FIGS. 10, 11) are arranged on a second side surface 28b side. The first and second wiring members 14b and 19b are arranged on the first side surface 28a side, respectively.

Moreover, as shown in FIG. 18, the CCD assembly 30 is attached to the camera module housing 22 to constitute the camera module 21 shown in FIG. 7. In FIG. 7, the image forming side is an upper side, and the ASIC (the third wiring member) 29 which connects the wiring members 14b and 19b to the CCD assembly 30 is disposed on the side surface of the camera module housing 22 (this ASIC 29 is also connected to the position detecting sensors 24k and 24m). In this case, wiring line spaces of the wiring members 14b and 19b are positioned in the second side surface 28b in the vicinity of the first side surface 28a, and a connecting portion which connects the wiring members 14b and 19b to the third wiring member is positioned on the second side surface 28b. Moreover, as shown in FIG. 8 in which it is assumed that the subject side is an upper side, the camera module 21 is completed.

It is to be noted that the inductor 24h shown in FIG. 17 is positioned on the second side surface 28b side, but the inductor 24h may be positioned on the first side surface 28a side. Similarly, the capacitor 24g is positioned on the first side surface 28a side, but the capacitor 24g may be positioned on the second side surface 28b side. The raised wall 24d in which the above electrical elements are stored does not have to be disposed in the case 24, and the lower cover 25 may be provided with a raised wall. Furthermore, the case 24 may be bonded to the lower cover 25 by bonding, for example, an engaging member to a member to be engaged. Furthermore, the case 24 may be bonded to the lower cover 25 by use of an adhesive.

As described above, the camera module 21 has a substantially cubic case article having four side surfaces parallel to the optical axis, and the piezo elements 20 and 20a are positioned on the side of one side surface of the case article. The driving shaft 27 is disposed in the vicinity of a corner portion defined by the above one side surface and the side surface adjacent to this one side surface, and the guide shaft 26 is disposed at a corner portion which faces this corner portion.

In the camera module 21 shown in FIG. 8 of Example 1, the optical lens 23 is disposed in a fixed manner, and the lens assemblies 10 and 15 are movably supported by the guide shaft 26 and the driving shaft 27. As described above with reference to FIG. 19, when the lens assembly 15 moves toward the optical lens 23, a telephoto state is achieved. Following the movement of the lens assembly 15, the lens assembly 10 also moves toward the optical lens 23. On the other hand, when the lens assembly 15 is returned toward the lens assembly 10, a wide-angle state is achieved, and the lens assembly 10 also moves following the movement of the lens assembly 15.

Moreover, the sensor tape is detected by the above position detecting sensors 24k and 24m, and these position detecting sensors 24k and 24m detect reference positions of the lens assemblies 15 and 10 and movement amounts from the reference positions.

In addition, when the piezo element 20 is energized, a high-order bend vibration is generated in the operating portion 20e to generate a traveling wave. Moreover, a frictional force is generated between an outer peripheral surface of the driving shaft 27 with which the operating portion 20e is brought into contact under pressure and the operating portion 20e, and this frictional force moves the lens assembly 10 having the piezo element 20 mounted thereon along the driving shaft 27 (see, e.g., Patent Documents 8, 11). That is, when the piezo element 20 is energized, the piezo element 20 performs a flexural motion. This flexural motion allows the lens assembly 10 to move along the driving shaft 27 owing to the frictional force generated between the driving shaft 37 and the operating portion 20e. It is to be noted that the lens assembly 15 also moves similarly.

As apparent from the above description, the surface processing of the driving shaft is varied. Therefore, the friction coefficient of the side of the piezo element on which the operating portion abuts is set to be high, and the friction coefficient of the side which abuts on the bearing section is set to be low. The driving force of the piezo element can efficiently be transmitted. As a result, the camera module can be miniaturized.

Furthermore, the section of the bearing section into which the driving shaft is inserted is formed into a substantially V-shape, the sliding area decreases. As a result, the friction coefficient can be minimized. The driving force of the piezo element can be increased. Two V-shaped grooves are formed in the upper and lower operating portions of the piezo element. Therefore, when the piezo element is driven, the driving load can uniformly be dispersed, and the driving of the piezo element can be stabilized.

Example 2

Figure 20:
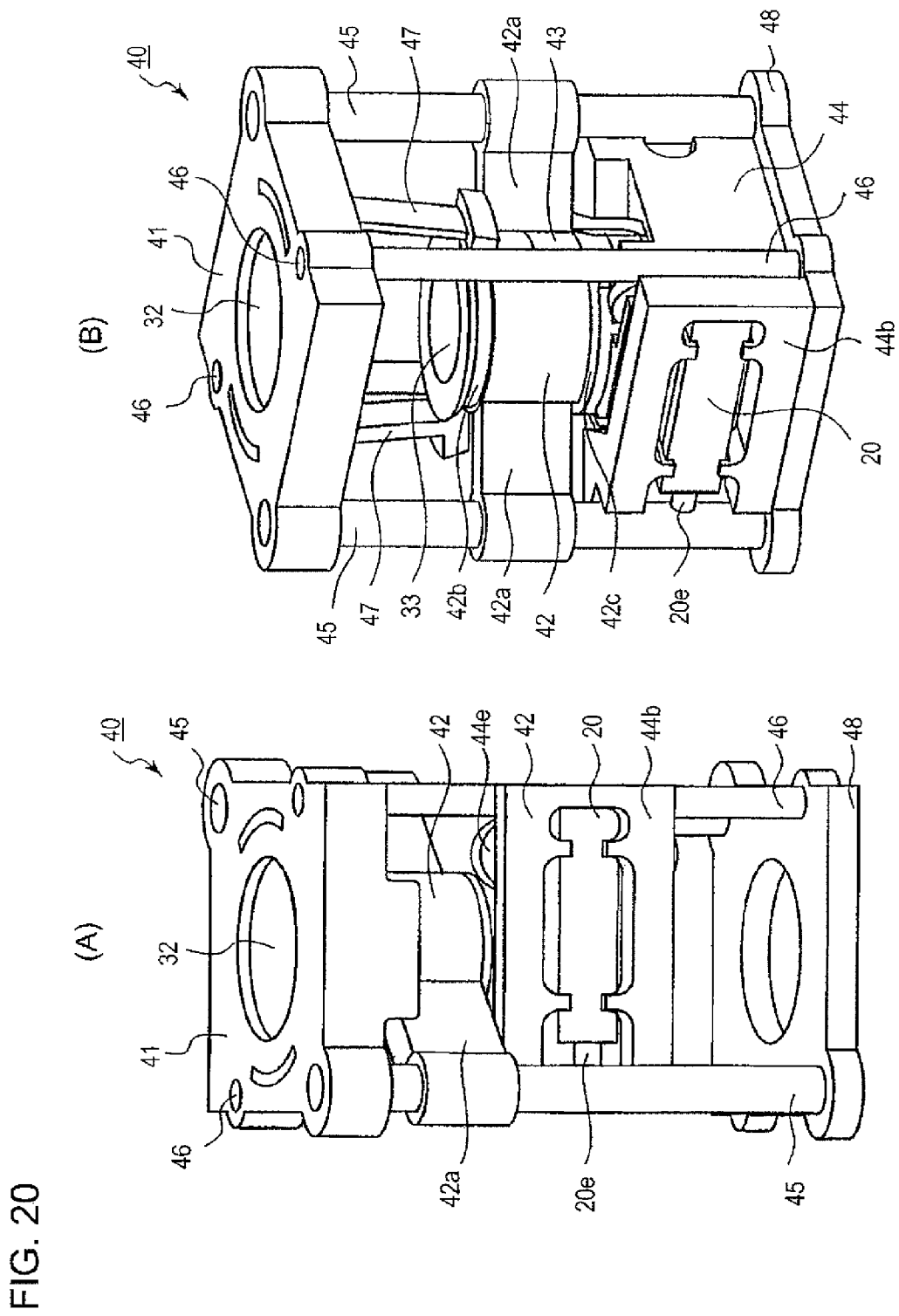
FIG. 20 is a perspective view of a camera module of an embodiment, (A) shows a state in which a lens for changing a focal length is disposed at a telephoto (tele)position, and (B) similarly shows a state in which the lens for changing the focal length is disposed at a wide-angle (wide) position.
Figure 21:
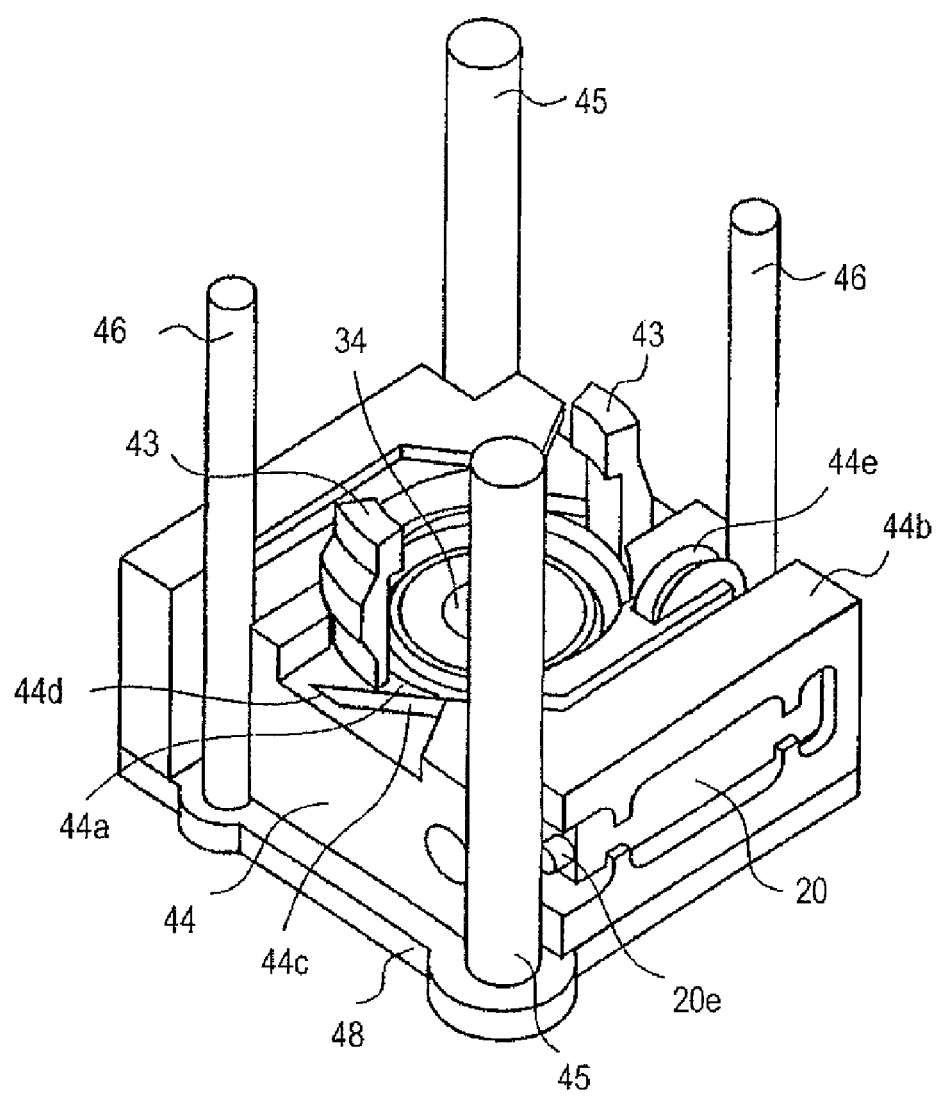
FIG. 21 is a perspective view from which a third lens holding unit to hold a first lens unit on a subject side in FIG. 20 and a second lens holding unit to hold a lens unit are omitted, showing a first lens holding unit to hold a third lens unit, a shaft member and a guide shaft member for vertically moving the first lens holding unit, and a part of a mechanism which moves the second lens holding unit.
Figure 22:
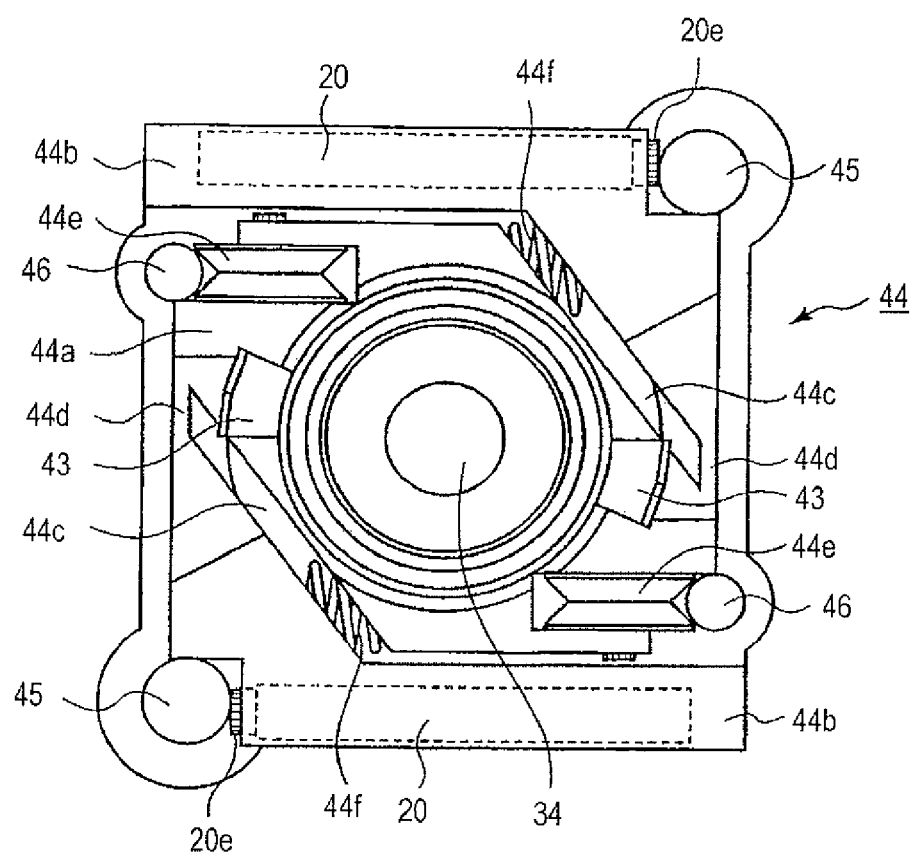
FIG. 22 is a plan view of the third lens holding unit.
Figure 23:
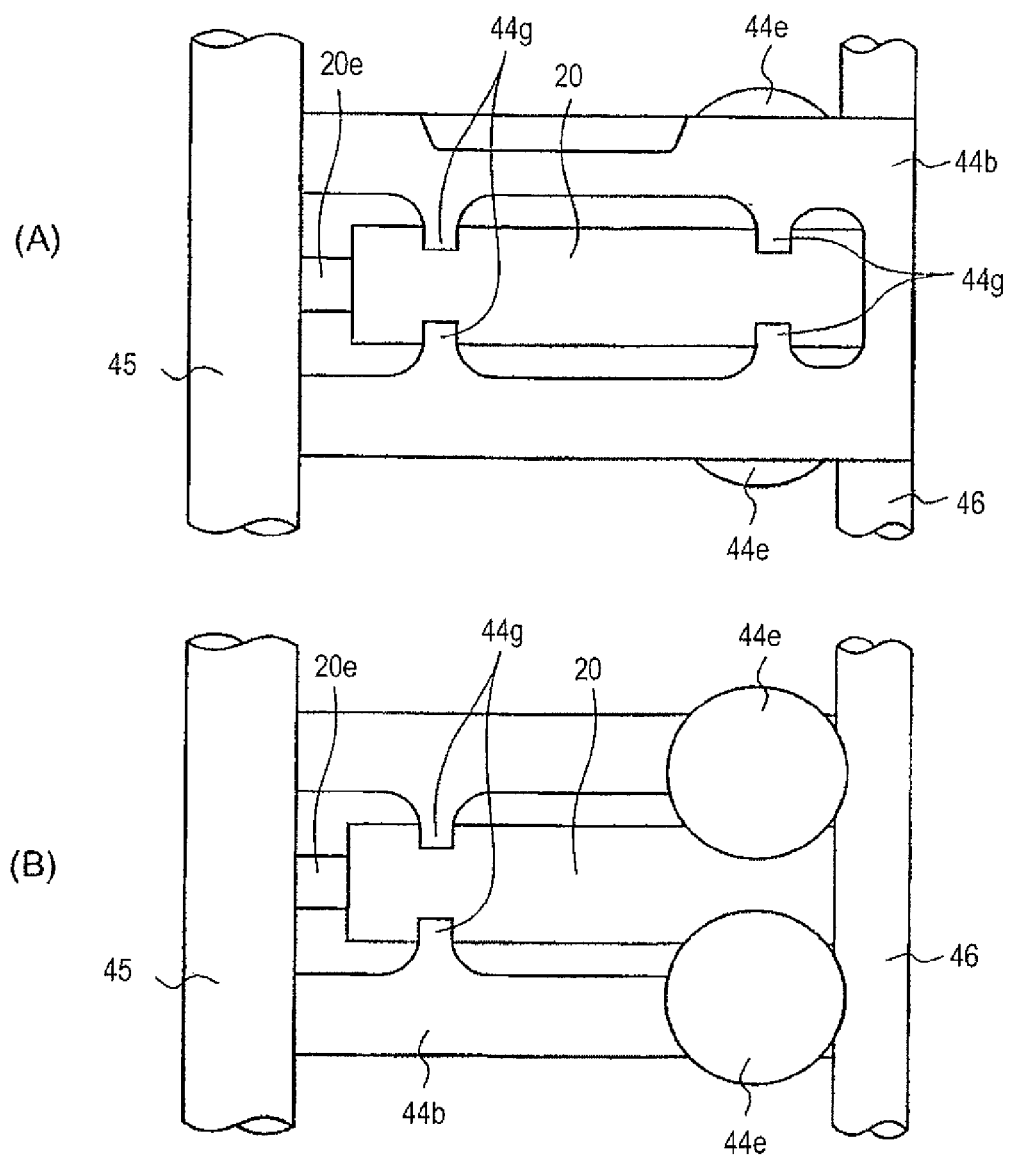
FIG. 23 shows a diagram (A) of a piezo element holding section of the third lens holding unit as viewed from the outside of the camera module, and a diagram (B) viewed from a lens side.
Figure 24:
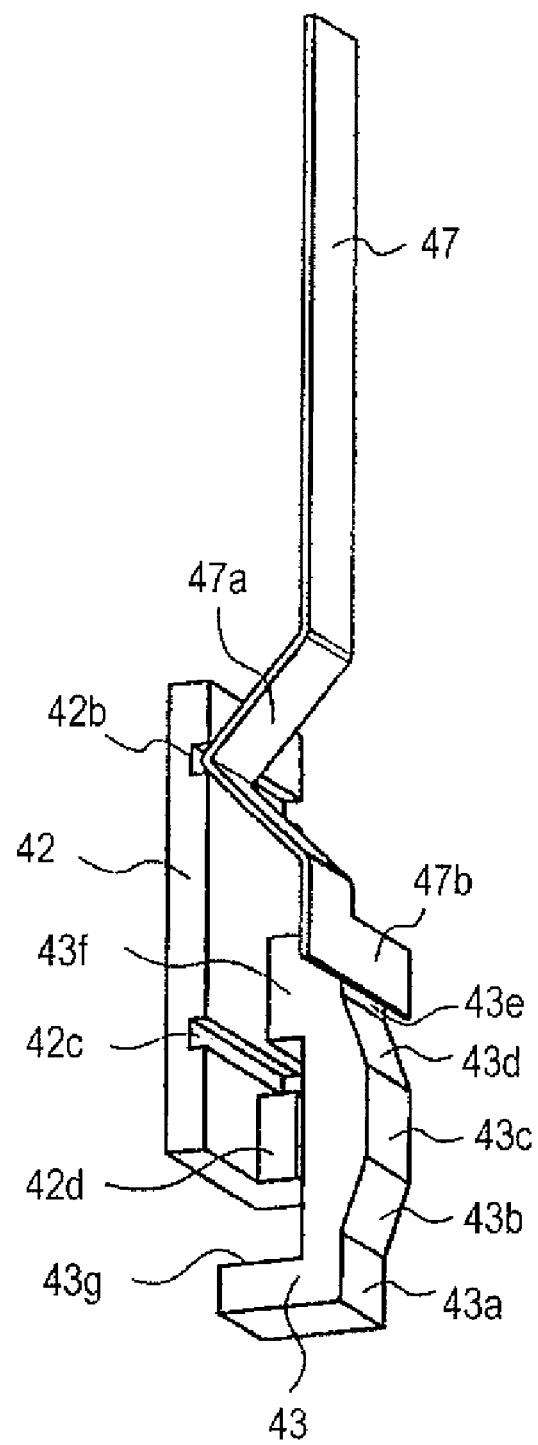
FIG. 24 is a perspective view showing a latch mechanism for moving and fixing a lens unit for changing a focal length in the camera module of the embodiment.
Figure 25:
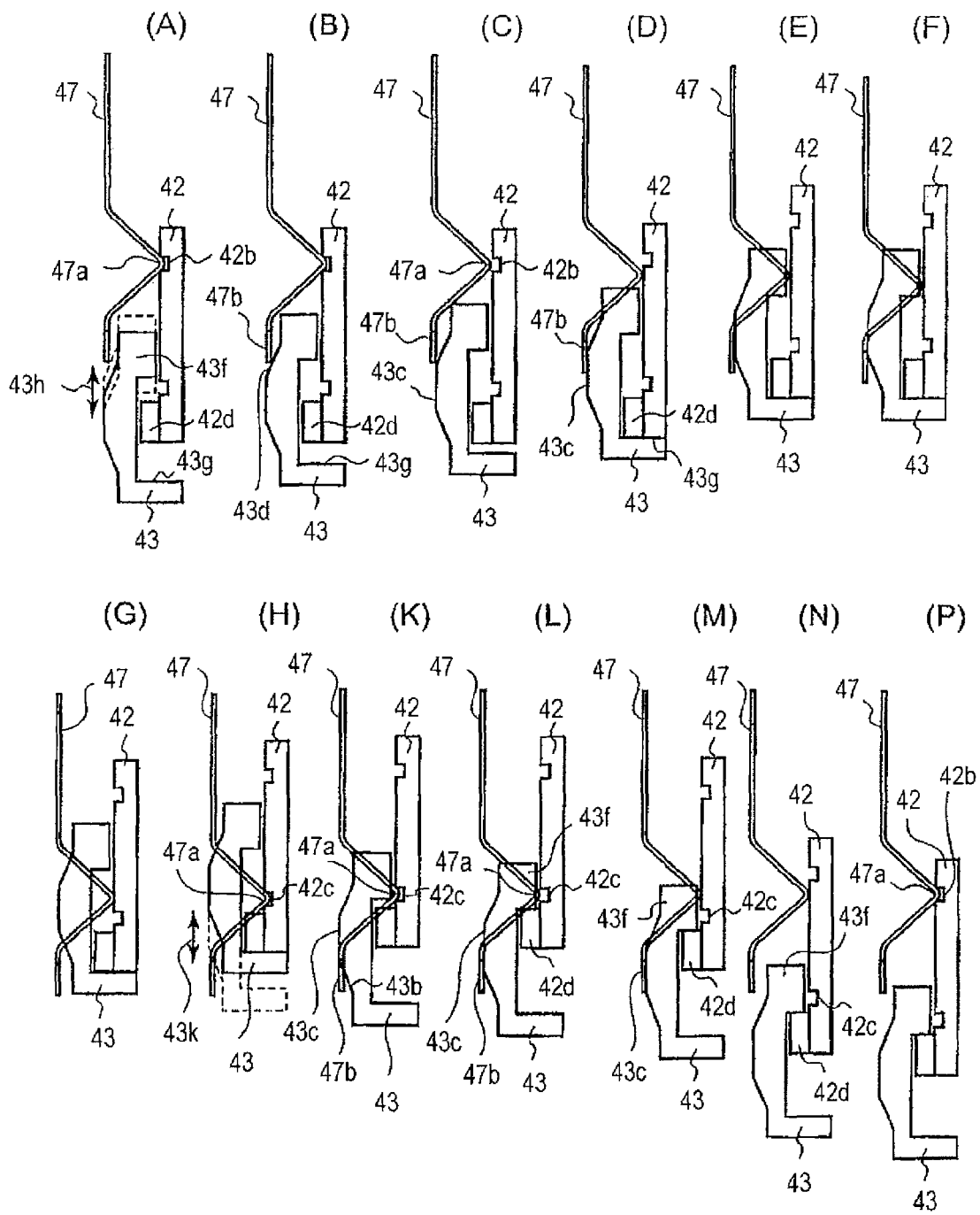
FIG. 25 is a diagram showing a mechanism for changing the focal length in the camera module of the embodiment and a lens moving state during auto-focusing.
Figure 26:
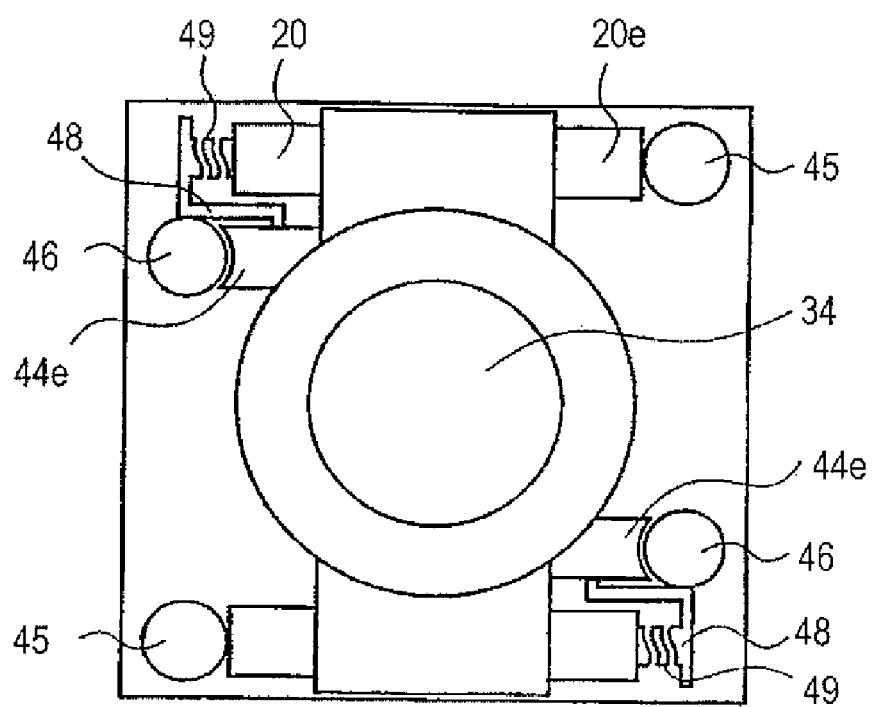
FIG. 26 is a plan view of a modification of the first lens holding unit.
Figure 27:
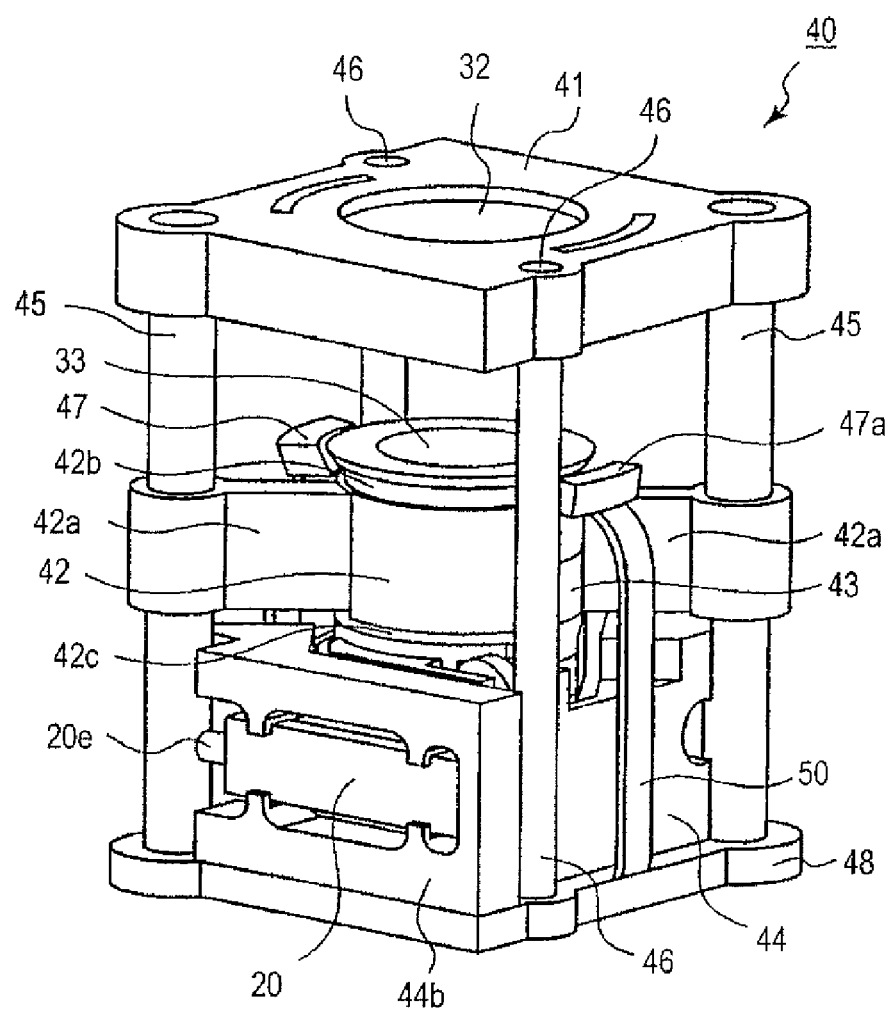
FIG. 27 is a perspective view showing another embodiment in which a lens holding unit for changing a focal length is moved.

FIGS. 20 to 27 are diagrams of a camera module 40 of Example 2. First, FIG. 20 is a perspective view of the camera module 40 of the embodiment, (A) shows a state in which a lens for changing a focal length is disposed at a telephoto (tele)position, and (B) similarly shows a state in which the lens for changing the focal length is disposed at a wide-angle (wide) position. FIG. 21 is a perspective view from which a third lens holding unit 41 to hold a first lens unit 32 on a subject side in FIG. 20 and a second lens holding unit 42 to hold a second lens unit 33 are omitted, showing a first lens holding unit 44 to hold a third lens unit 34, shaft members 45 and guide shaft members 46 for vertically moving the first lens holding unit 44, and a part of a mechanism which moves the second lens holding unit 42. FIG. 22 is a plan view of the first lens holding unit 44, and FIG. 23 shows a diagram (A) of a piezo element holding section 44b of the first lens holding unit 44 as viewed from the outside of the camera module, and a diagram (B) viewed from a lens side. FIG. 24 is a perspective view schematically showing a mechanism for moving and fixing a lens unit for changing the focal length in the camera module 40 of the embodiment, and FIG. 25 is a diagram showing a mechanism for changing the focal length in the camera module 40 of the embodiment and a lens moving state during auto-focusing. FIG. 26 is a plan view of a modification of the first lens holding unit 44, and FIG. 27 is a perspective view showing another embodiment in which a focal length changing lens holding unit is moved.

As described above with reference to FIG. 19, the camera module 40 of the embodiment shown in FIG. 20 has the first lens unit 32 on the subjects side, the second lens unit 33 disposed on an image pickup element 35 side, and further the third lens unit 34 (not shown in FIG. 20) disposed on the image pickup element 35 side as shown in FIG. 21. The lens units are held by the third lens holding unit 41 which holds the first lens unit 32, the cylindrical second lens holding unit 42 which holds the second lens unit 33 and the first lens holding unit 44 which holds the third lens unit 34 as described later in detail with reference to FIGS. 22, 23, respectively.

It is to be noted that the camera module 40 of the embodiment shown in FIG. 20 will be described as one example of a double-focus type camera module to switch the focal length to the telephoto (tele)position and the wide-angle (wide) position, but the present invention is applicable to not only the double-focus type but also a usual zoom lens capable of continuously changing the focal length.

Moreover, substantially at corner portions of the third lens holding unit 41 and a base 48 which holds an image pickup element 35 such as a CCD (not shown), the shaft members 45 and the guide shaft members 46 are preferably substantially symmetrically arranged centering on an optical axis and in parallel with each other in order to pass and guide support arms 42a which are disposed on the second lens holding unit 42. Moreover, the shafts are allowed to abut on a spacer 20e having a substantially rectangular plate-like outer shape and disposed in the first lens holding unit 44 in a direction substantially crossing the optical axis at right angles as an operating portion of a piezo element 20 as a driving member described in detail with reference to FIG. 3, so that these second lens holding unit 42 and first lens holding unit 44 are vertically moved. It is to be noted that each shaft member 45 may be constituted of a lead screw or the like.

Furthermore, latching arms 47 as engaging portions hang from the third lens holding unit 41 in order to position and fix the second lens unit 33 held by the second lens holding unit 42 in the wide-angle position and the telephoto position as described later with reference to FIG. 24 schematically showing a constitution for movement. At upper and lower portions of an outer periphery of the second lens holding unit 42, grooves 42b and 42c are arranged as portions to be engaged for latching this latching arms 47. Furthermore, as shown in FIG. 21, the first lens holding unit 44 is provided with second lens holding unit movement members 43 having convex portions on an outer peripheral side in order to vertically move the second lens holding unit 42 and change the focal length; disengagement portions to unlatch the latching arms 47 from the second lens holding unit 42; and engagement portions to move the second lens holding unit 42. Moreover, in order to smoothly vertically move the first lens holding unit 44, two upper and lower V-shaped rollers 44e as roller members are arranged on a right side of the first lens holding unit 44 in the drawing, and only one roller member for balancing is disposed on a left side. It is to be noted that details of the mechanism for moving this second lens holding unit 42 in order to change the focal length will be described later in detail with reference to FIGS. 24, 25.

FIG. 22 is a plan view of the first lens holding unit 44 which holds the third lens unit 34, and FIG. 23 shows a diagram (A) of the piezo element holding section of the first lens holding unit as viewed from the outside of the camera module, and a diagram (B) viewed from the lens side. In the first lens holding unit 44 which holds the third lens unit 34, in order to vertically move the second lens holding unit 42 which holds the second lens unit 33, as shown in FIG. 21, two second lens holding unit movement members 43 having the disengagement portions and the engagement portions constituting the latch mechanism described later with reference to FIG. 24 are arranged symmetrically with respect to the optical axis. Furthermore, as shown in the plan view of FIG. 22, the third lens unit 34 is held in the center. The first lens holding unit 44 is provided with a bearing section divided into three parts by holding sections 44b of the piezo element 20 which face each other via substantially symmetrically formed slits 44c centering on the optical axis in a central portion 44a where the third lens unit 34 is disposed, the holding sections being connected to each other by thin portions 44d in a direction substantially crossing the optical axis at right angles. Furthermore, at rotary symmetric positions with respect to the central optical axis of the lens unit 34, as shown in FIG. 23, there is disposed the bearing section including two upper and lower V-shaped rollers 44e which are the roller members to vertically move this first lens holding unit 44 while stopping rotation. It is to be noted that as described above, the holding unit 44 of the piezo element 20 on an opposite side of the optical axis is a bearing section provided with only one V-shaped roller 44e for balancing.

As shown in FIG. 23, the holding section 44b of the piezo element 20 in this first lens holding unit 44 is provided with holding portions 44g which are opened on the left side in the drawing and which hold a main part of the piezo element 20. The holding section includes therein a space for holding the inserted piezo element 20. Moreover, in the section, members are arranged which correspond to support articles denoted with 20f, 20g and support articles denoted with 20h, 20k provided with springs in FIG. 3(B) (a support article 20m provided with a spring corresponds to a coil spring 44f) so that the piezo element 20 can deform as shown in FIG. 3(C) described above.

Moreover, as shown in FIG. 23(B), on a right side of this holding portion 44g in the drawing, the V-shaped rollers 44e as the roller members having V-shaped portions which abut on the guide shaft member 46 are arranged at two upper and lower places so that this holding portion 44g can smoothly move up and down as described above.

On the other hand, in order to press the spacer 20e of the piezo element 20 disposed in the holding section 44b onto the shaft member 45 with a predetermined pressing force, between the holding section 44b of this piezo element 20 and the central portion 44a provided with the second lens unit 33, the coil spring 44f is disposed at a position corresponding to that of the V-shaped roller 44e to apply a force in such a direction as to separate the holding section 44b of the piezo element 20 and the central portion 44a provided with the second lens unit 33 from each other.

To dispose this coil spring 44f, for example, a hole to receive the coil spring 44f is disposed on a central portion 44a side provided with the third lens unit 34, and a hole including therein a female screw extending to an outer wall of this holding section 44b is disposed on the side of the holding section 44b of the piezo element 20 facing the spring receiving hole via the slit 44c. After inserting the coil spring 44f into this hole and the hole on the central portion 44a side, the female screw is inserted to close the hole. Moreover, the spring is disposed so that a pressure contact force of the coil spring 44f can be adjusted. Alternatively, the central portion 44a provided with the third lens unit 34 and the holding section 44b of the piezo element 20 are separately prepared, and holes into which the coil spring 44f is to be inserted are arranged in both of the central portion and the holding section. After inserting the coil spring 44f, the coil spring is connected to the thin portion 44d in the vicinity of the thin portion by engagement, welding or the like. In a case where the thin portions 44d are constituted of spring members, the holding sections 44b of the piezo element 20 may be opened from the central portion 44a provided with the second lens unit 33 by use of spring properties of the spring members, and the coil springs 44f may be attached to holes disposed in the central portion and the holding section.

When the first lens holding unit 44 is provided with the slits 44c and the coil springs 44f in this manner, a degree of freedom can be imparted to the third lens unit 34 held by the slits 44c in a circumferential direction, and rigidity can be imparted in the optical axis direction. Furthermore, the coil spring 44f can press the spacer 20e of the piezo element 20 disposed in the holding section 44b onto the shaft member 45 with a predetermined pressing force. Moreover, the V-shaped roller 44e which abuts on the guide shaft member 46 stops rotation of the first lens holding unit 44 to which a force has been applied in a rotating direction centering on the optical axis with respect to the shaft member 45 owing to the pressing force of the coil spring. A signal voltage is applied to the piezo element 20 in such a manner that deformation continuously occurs in the element as shown in FIG. 3(C). In consequence, this first lens holding unit 44 can move up and down owing to a frictional force between the spacer 20e and the shaft member 45.

On the other hand, as shown in FIG. 20, the second lens holding unit 42 which holds the second lens unit 33 extends toward the shaft members 45 and is supported by the support arms 42a inserted into the shaft members 45. When the first lens holding unit 44 moves up and down, the second lens holding unit is latched by a latch mechanism shown in FIGS. 24, 25 to the telephoto (tele)position of FIG. 20(A) and the wide-angle (wide) position of FIG. 20(B).

FIG. 24 schematically shows components constituting this latch mechanism, and FIG. 25 is a schematic diagram showing how the second lens holding unit 42 holding the second lens unit 33 moves and is fixed in accordance with the movement of the first lens holding unit 44 holding the third lens unit 34. In the drawing, reference numeral 42 is a part of the second lens holding unit 42 which holds the second lens unit 33 as shown by 42 in FIG. 20. Grooves 42b, 42c which are engaged portions disposed at upper and lower portions of the second lens holding unit 42 are latching grooves for latching a latch portion 47a which is an engaging portion disposed on a latching arm denoted with 47 in FIG. 20. Reference numeral 42d is an engaged portion which is engaged with a first engaging portion 43f of a second lens holding unit movement member denoted with 43 in FIGS. 20, 21 and 22 and which moves the second lens holding unit 42 holding the second lens unit 33 vertically in the drawing. A portion denoted with 47a and bent in a mountain shape toward the second lens holding unit 42 in the latching arm 47 is a latch portion which is an engaging portion, and 47b is an unlatching portion for unlatching the latch portion 47a of the latching arm 47. Reference numerals 43b, 43c and 43d are slant portions (43b, 43d) and a vertex portion (43c), which are disengagement portions on which the unlatching portion 47b of this latching arm 47 rides and which unlatch the latch portion 47a. Reference numerals 43a, 43e are flat portions to be latched, 43f is a first engaging portion as described above, and 43g is a second engaging portion which engages with an engaged portion 424.

FIG. 25(A) shows a wide-angle state in which the second lens unit 33 and the third lens unit 34 shown in FIG. 19(A) are distant from the first lens unit 32, FIG. 25(H) shows a telephoto state in which the second lens unit 33 and the third lens unit 34 come close to the first lens unit 32 as shown in FIG. 19(B), and FIGS. 25(B) to (G) show intermediate states. Similarly, FIG. 25(P) shows a wide-angle state in which the second lens unit 33 and the third lens unit 34 are distant from the first lens unit 32, and FIGS. 25(K) to (N) show intermediate states. In FIG. 25(A), 43h is a range denoted with 36 in FIG. 19(C) in which the third lens unit 34 in the wide-angle position moves in order to perform focusing. Similarly, in FIG. 25(H), 43k is a range in which the third lens unit 34 in the telephoto position moves in order to perform the focusing.

In the wide-angle state shown in FIG. 25(A) in which the second lens unit 33 and the third lens unit 34 are distant from the first lens unit 32, as shown in FIG. 20(B), the latch portion 47a of the latching arm 47 hanging from the third lens holding unit 41 latches the latching groove 42b of the second lens holding unit 42 to fix this groove at a wide-angle position. Since the engaged portion 42d of the second lens holding unit 42 is disposed between the first engaging portion 43f and the second engaging portion 43g, the second lens holding unit movement member 43 disposed in the first lens holding unit 44 can move without coming into contact with this engaged portion 42d, even if the first lens holding unit 44 is driven by the piezo element 20 to move in a range denoted with reference numeral 43h for the focusing (focus adjustment).

In order to shift from this state to the telephoto state shown in FIG. 19(B), as shown in FIG. 25(B), the first lens holding unit 44 is driven upwards in the drawing by the piezo element 20, the second lens holding unit movement member 43 rises, and the slant portion 43d of the member pushes up the unlatching portion 47b of the latching arm 47. Moreover, as shown in FIG. 25(C), when the unlatching portion 47b reaches the top portion 43c of the second lens holding unit movement member 43, the latching groove 42b of the second lens holding unit 42 is unlatched from the latch portion 47a, and the movement member further rises and is brought into a state of FIG. 25(D). When the unlatching portion 47b runs on the top portion 43c of the second lens holding unit movement member 43, the latch portion 47a is not brought into contact with the second lens holding unit 42. Moreover, the engaged portion 42d comes into contact with the second engaging portion 43g to push up the second lens holding unit 42.

Moreover, as shown in FIGS. 25(E), 25(F) and 25(G), when the second lens holding unit 42 is pushed up to reach a state of FIG. 25(H), the latch portion 47a of the latching arm 47 then latches the latching groove 42c of the second lens holding unit 42, and this groove is fixed at the telephoto position. Therefore, in the same manner as in FIG. 25(A), since the engaged portion 42d of the second lens holding unit 42 is disposed between the first engaging portion 43f and the second engaging portion 43g, the second lens holding unit movement member 43 disposed in the first lens holding unit 44 can move without coming into contact with this engaged portion 42d, even if the first lens holding unit 44 is driven by the piezo element 20 to move in a range denoted with reference numeral 43k for the focusing (focus adjustment).

To return from this state to the state shown in FIG. 25(A), as shown in FIG. 25(K), the first lens holding unit 44 is driven downwards in the drawing by the piezo element 20, the second lens holding unit movement member 43 lowers, and the slant portion 43b of the member pushes up the unlatching portion 47b of the latching arm 47. Moreover, as shown in FIG. 25(L), when the unlatching portion 47b reaches the vertex portion 43c of the second lens holding unit movement member 43, the latching groove 42c of the second lens holding unit 42 is unlatched from the latch portion 47a, and the movement member further lowers to reach a state of FIG. 25(M). When the unlatching portion 47b runs on the vertex portion 43c of the second lens holding unit movement member 43, the latch portion 47a does not come into contact with the second lens holding unit 42. Moreover, the engaged portion 42d comes into contact with the first engaging portion 43f to push down the second lens holding unit 42.

Moreover, as shown in FIG. 25(N), when the second lens holding unit 42 is pushed down to reach a state of FIG. 25(P), the latch portion 47a of the latching arm 47 then latches the latching groove 42b of the second lens holding unit 42, and fixes the groove at the wide-angle position to return to the state of FIG. 25(A).

In the camera module 40 of the embodiment constituted in this manner, when a control circuit (not shown) applies a driving current constituted of a driving signal to the piezo element 20, as described above, the spacer 20e vibrates to excite a reciprocating motion, and the first lens holding unit 44 holding this piezo element 20 moves upwards or downwards in FIG. 20. Therefore, for example, as shown in FIG. 20(A), in a case where the second lens holding unit 42 is at the telephoto position (the state of FIG. 25(H)) and the control circuit (not shown) performs the focusing of the camera module 40, when the first lens holding unit 44 is moved in a range denoted with 37 in FIG. 19(C), an image pickup element denoted with 35 in FIG. 19(B) can be focused.

Moreover, to change the camera module 40 from this state to the wide-angle end shown in FIG. 20(B) (the state of FIG. 25(P) or (A)), the control circuit (not shown) applies, to the piezo element 20, such a driving current as to move downwards the first lens holding unit 44. When this first lens holding unit 44 then lowers, the unlatching portion 47b of the latching arm 47 shown in FIG. 24 runs on the slant portion 43b of the second lens holding unit movement member 43, and the latch portion 47a is detached from the latching groove 42c disposed in the second lens holding unit 42.

Furthermore, when the first lens holding unit 44 is moved downwards as it is, the latch portion 47a of the latching arm 47 passes over the latching groove 42b, the second lens holding unit 42 is fixed in the state of FIG. 20(B), and the first lens holding unit 44 is moved in a range denoted with 36 in FIG. 19(C). In consequence, an image pickup element denoted with 35 in FIG. 19(A) can be focused. Therefore, movable ranges denoted with 36, 37 in FIG. 19(C) in which the first lens holding unit 44 moves for the focusing are ranges in which the first engaging portion 43f and the second engaging portion 43g of the second lens holding unit movement member 43 in FIG. 24 can move without coming into contact with the engaged portion 42d. It is to be noted that the camera module is moved from the wide-angle end to the telephoto end as described above with reference to FIG. 25, and description thereof is therefore omitted.

Since the camera module 40 is constituted in this manner, the auto-focusing (AF) and the changing of the focal length can be performed only by applying a signal current to the piezo element 20. In addition, as described above, the piezo element 20 has advantages that the element operates at a low speed, but has a high torque and excellent response and controllability, can finely be positioned and is small and light. Therefore, it is possible to provide a camera module which is small and light and which can perform the changing of the focal length and the focusing in a short time.

It is to be noted that a configuration of the first lens holding unit 44 which holds the third lens unit 34 as shown in FIG. 22 and a constitution of the latch mechanism shown in FIG. 24 are not limited to the shown configuration and constitution. For example, the first lens holding unit 44 may have a configuration shown in FIG. 26. The latching arm 47 does not have to hang from the third lens holding unit 41 which holds the first lens unit 32 as shown in FIG. 20, and may have a configuration of an arm 50 raised from a base 26 as shown in FIG. 27. The same constituting elements of the first lens holding unit shown in FIG. 26 as those for use in the first lens holding unit 44 shown in FIG. 22 are denoted with the same reference numerals.

First, the first lens holding unit shown in FIG. 26 is similar to the first lens holding unit 44 shown in FIG. 22 in that the piezo element 20 is allowed to abut on the shaft member 45 and the V-shaped roller 44e is allowed to abut on the guide shaft member 46. However, to press the piezo element 20 onto the shaft member 45, in the embodiment of FIG. 22, the central portion 44a provided with the third lens unit 34 and the holding section 44b of the piezo element 20 are separated from each other by the slit 44c, and the coil spring 44f is interposed between them. In this embodiment of FIG. 26, however, a shaft holding member 48 of a V-shaped roller 44e is bent to dispose an urging member 49. In this case, since the coil spring 44f does not have to be interposed between the central portion 44a provided with the third lens unit 34 and the holding section 44b of the piezo element 20, assembling is further facilitated. An operation and an effect in this case are similar to those of the embodiment shown in FIG. 22.

Moreover, in the latch mechanism shown in FIG. 27, unlike FIG. 20, the latching arm 47 does not hang from the third lens holding unit 41 which holds the first lens unit 32, and the arm 50 is raised from the base 26. Since another operation is similar to that described above with reference to FIGS. 24, 25, description thereof is omitted.

It is to be noted that it has been described above that the first lens holding unit 44 is provided with the piezo element 20, and this piezo element 20 vertically moves the first lens holding unit 44 to move the second lens holding unit 42, but the second lens holding unit 42 may be provided with a piezo element so that the units can independently be driven.

Example 3

Figure 28:
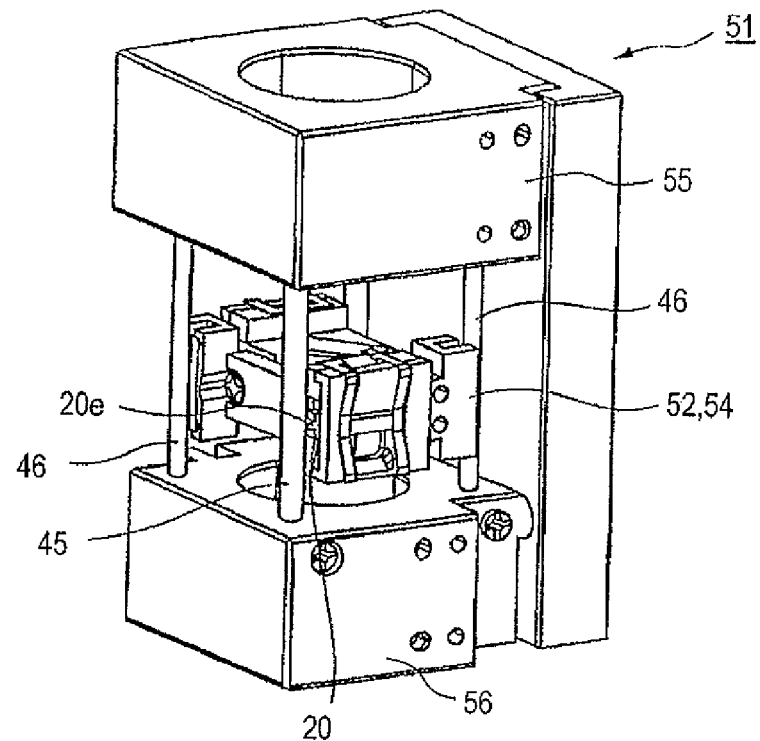
FIG. 28 is a perspective view showing Example 3 of the camera module of an embodiment.
Figure 29:
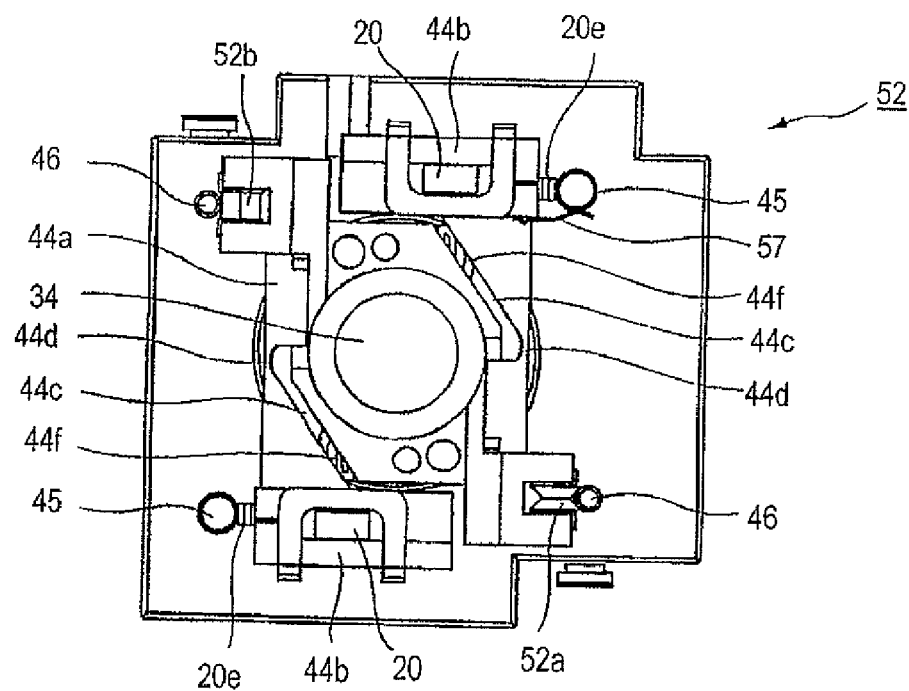
FIG. 29 is a plan view of a vertically movably constituted lens holding unit which holds a lens and a piezo element in Example 3.
Figure 31:
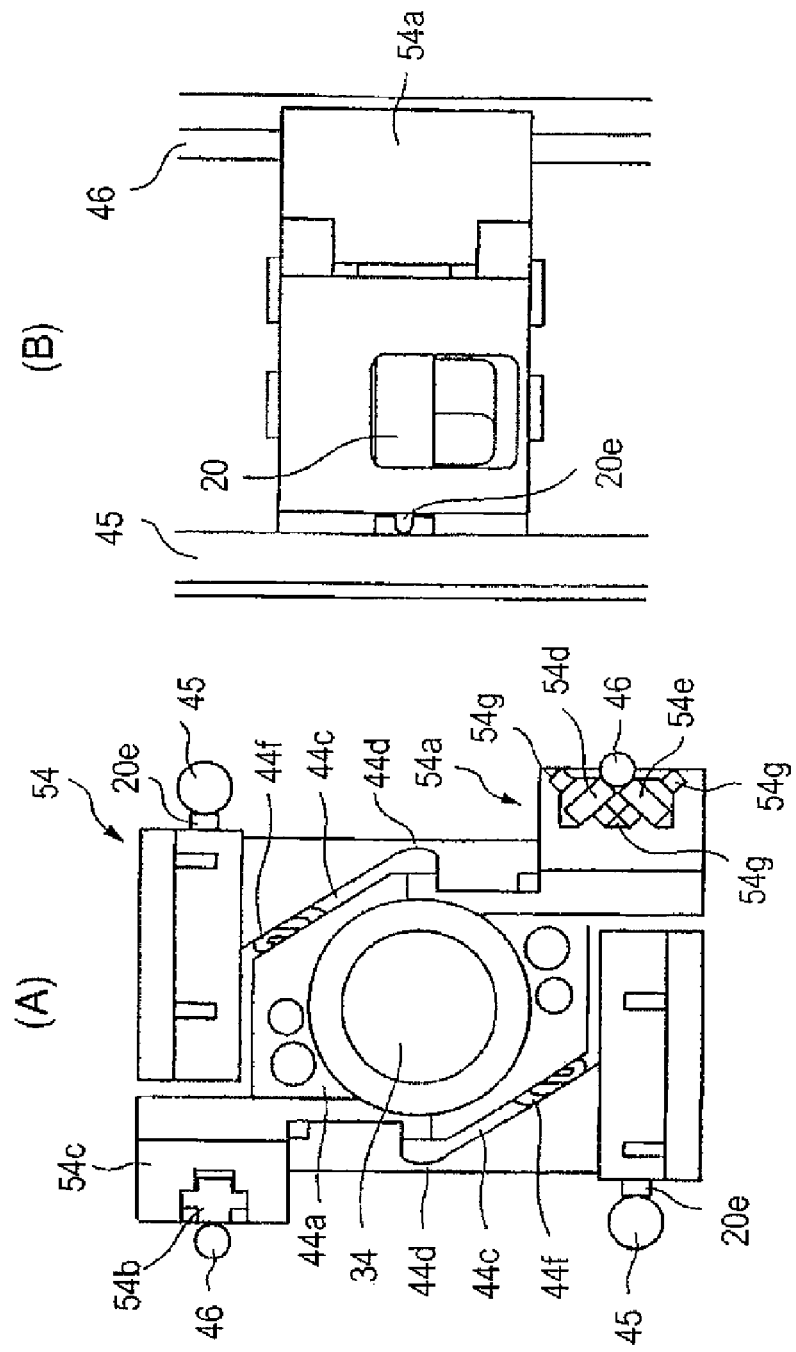
FIG. 31 shows a plan view (A) of another embodiment of a vertically movably constituted lens holding unit which holds a lens and a piezo element, and a side view (B) viewed from a piezo element side.
Figure 32:
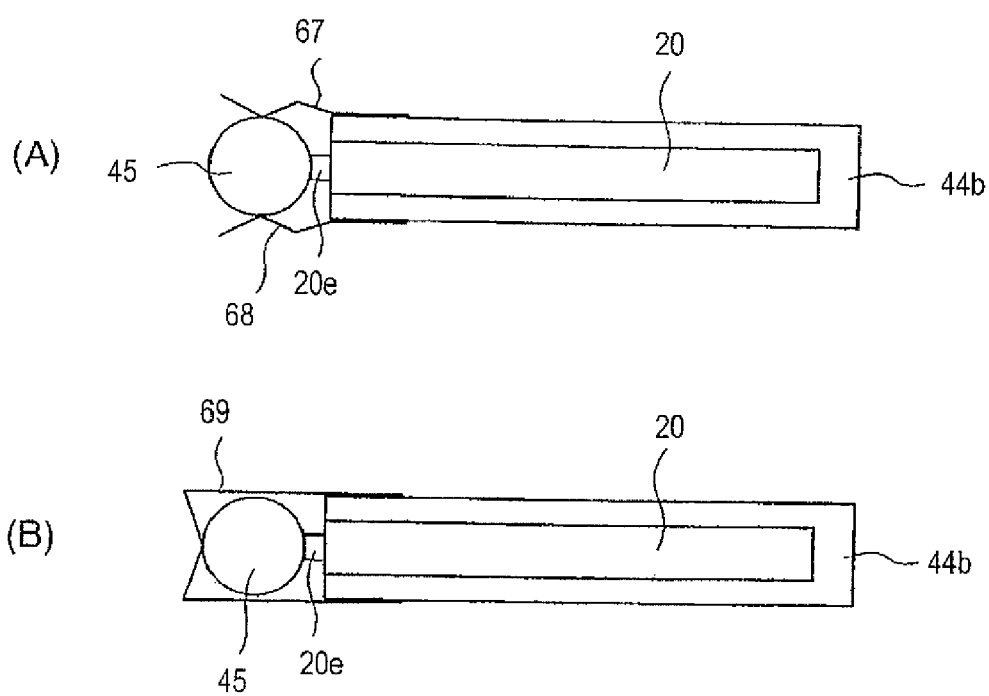
FIG. 32 is a diagram showing an embodiment in which a driving current of the piezo element is taken from a shaft member in a camera module of Example 4.
Figure 33:
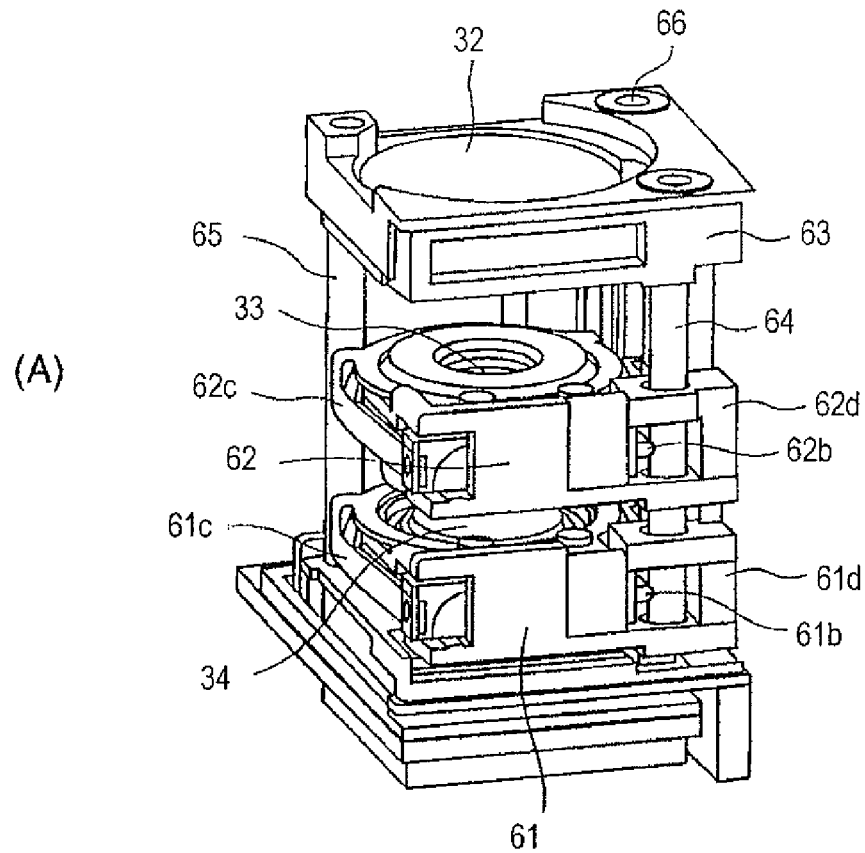
FIG. 33 shows a perspective view (A) of a camera module of Example 5, and a sectional view (B) showing a piezo element part.
Figure 33:
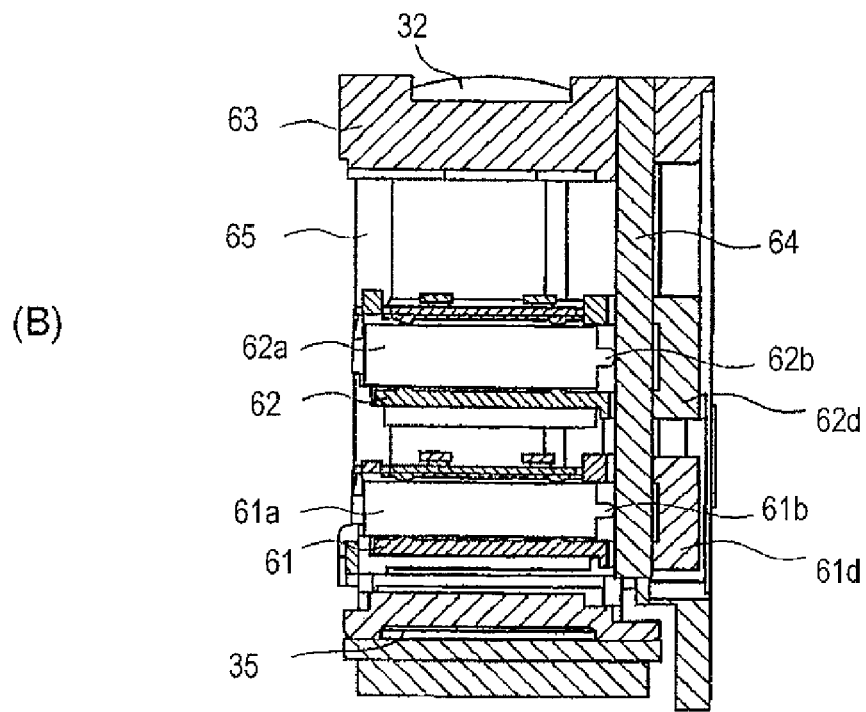
Figure 34:
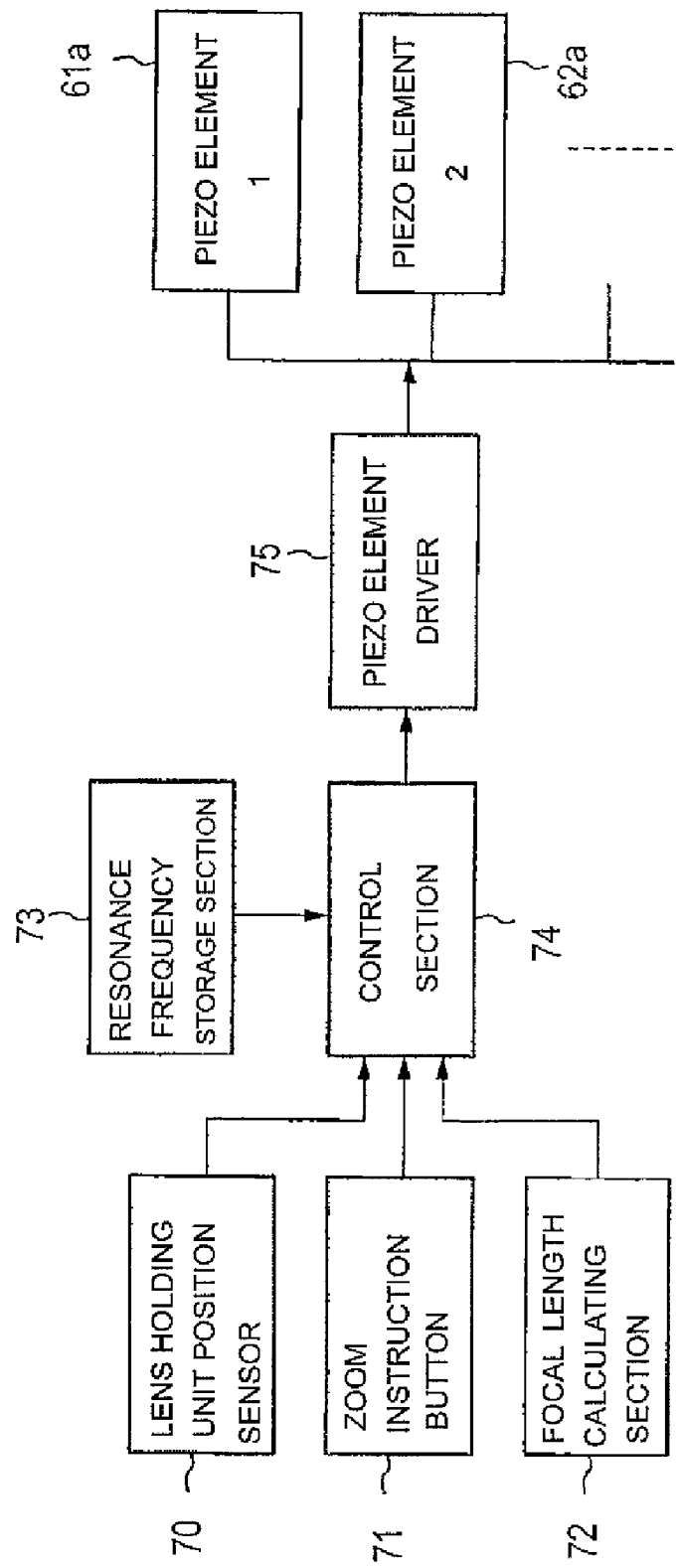
FIG. 34 shows one example of a control circuit which drives a plurality of movable piezo elements having different resonance frequencies.

FIG. 28 is a perspective view showing Example 3 of a camera module 51 of an embodiment, and FIG. 29 is a plan view of a vertically movably constituted lens holding unit which holds a lens and a piezo element in Example 3. FIG. 31 shows a plan view (A) of another embodiment of the vertically movably constituted lens holding unit which holds the lens and the piezo element, a side view (B) viewed from a piezo element side, and a side view (C) and a perspective view (D) of a roller which abuts on a guide shaft of the lens holding unit. FIG. 32 is a diagram showing an embodiment in which a driving current of the piezo element is taken from a shaft member in a camera module of Example 4. FIG. 33 shows a perspective view (A) of a camera module of Example 5, and a sectional view (B) showing a piezo element part, and FIG. 34 shows one example of a control circuit which drives a plurality of movable piezo elements having different resonance frequencies. In the drawings, the same constituting elements are denoted with the same reference numerals.

It is to be noted that in the camera module 51 shown in FIG. 28, for the sake of description, the second lens holding unit 42 of Example 1 described above is omitted. The third lens holding unit 41 is denoted with 55, and the base 26 is denoted with 56. In the drawings, constituting elements similar to those of Example 1 are denoted with the same reference numerals. In FIG. 29, 34 is a third lens unit, 20 is a piezo element, 20e is a spacer, 44a is a central portion provided with the third lens unit 34, 44b is a holding section of the piezo element 20, 44c is a slit, 224 is a thin portion, 44f is a coil spring, 45 is a shaft member, and 46 is a guide shaft member.

In the camera module 40 of Example 2 described above, as shown in FIG. 22, two V-shaped rollers 44e are used in order to stop rotation of the first lens holding unit 44. However, for example, in a case where either of the V-shaped rollers 44e does not correctly abut on the guide shaft member 46 owing to a manufacturing error, both of the V-shaped rollers 44e is to abut on the guide shaft member 46 owing to the presence of the coil spring 44f, and an optical axis of the held third lens unit 34 fluctuates.

To solve the problem, in the first lens holding unit 51 shown in FIG. 29 in the camera module 51 of Example 3 shown in FIG. 28, a roller which abuts on one guide shaft member 46 is the same V-shaped roller 52a as that of Example 1, and a roller 52b which abuts on the other guide shaft member 46 is a usual cylindrical flat roller. In this case, since the flat roller 52b simply abuts on the guide shaft 46, an abutment position can freely be moved. Even if the manufacturing error is generated, an optical axis position of the third lens unit 34 held by the first lens holding unit 51 is defined by the V-shaped roller 52a. Therefore, in the other flat roller 52b, the optical axis of the third lens unit 34 does not fluctuate owing to the error. Since another constitution or operation is similar to that of Example 1 described above, description thereof is omitted.

FIG. 31 shows a plan view (A) of another embodiment of a vertically movably constituted first lens holding unit 54 which holds a lens and a piezo element, and a side view viewed from a piezo element 20 side.

In this embodiment shown in FIG. 31, as apparent from the plan view of FIG. 31(A) of the vertically movably constituted lens holding unit 54 which holds the piezo element 20, one roller 54b which abuts on the guide shaft member 46 is a cylindrical flat roller in the same manner as in the roller 52b shown in FIG. 29, and the other roller which abuts on the guide shaft member 46 is constituted by storing flat rollers 54d, 54e having a cylindrical shape in the roller module 54a so that the rollers form a V-shape with respect to the guide shaft member 46. FIG. 31(B) is a side view of this first lens holding unit 44 viewed from the piezo element 20 side. As described above with reference to FIGS. 30(a), (b) and (c), the flat rollers 54d, 54e are held by a U-shaped bearing 54g so as to form the V-shape in a V-shaped cut 54f disposed in this roller module 54a.

That is, the V-shaped roller denoted with 52a in FIG. 29 sometimes rattles in a thrust direction owing to the manufacturing error, and the optical axis of the third lens unit 34 held by the first lens holding unit sometimes fluctuates. However, in a case where the roller which abuts on the guide shaft member 46 is constituted in this manner, any thrust error at a time when the V-shaped roller 52a is used is not generated. Even in a case where the manufacturing error is generated, when the guide shaft member 46 is allowed to abut on a V-shaped valley formed at a time when the flat rollers 54d, 54e cross each other at right angles, the optical axis of the third lens unit 34 is not influenced by the thrust rattles of the flat rollers 54d, 54e, and does not fluctuate. Since another constitution or operation is similar to that of Example 2, description thereof is omitted.

Figure 30:
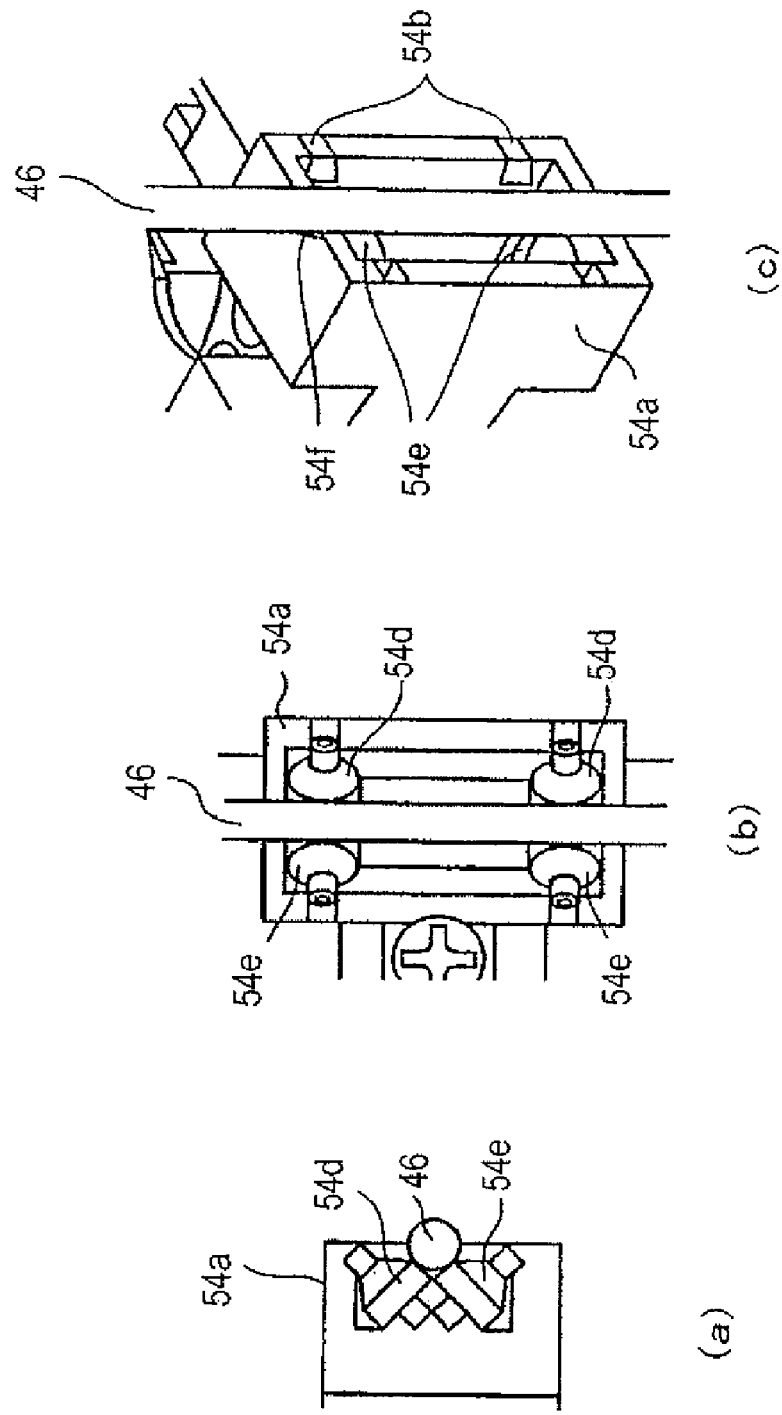
FIG. 30 is a diagram of a constitution in which two rollers having flat surfaces facing a guide shaft in a guiding abutment section of a lens holder are arranged in a V-form, (a) is a sectional view, (b) is a side view viewed from a guide shaft side, and (c) is a perspective view.

Moreover, the fluctuation of the optical axis of the third lens unit 34 generated by the manufacturing error at a time when two V-shaped rollers 44e shown in FIG. 22 are used is prevented by the methods shown in FIGS. 29, 30 and 31 in which the roller allowed to abut on the guide shaft member 46 in order to stop the rotations of the first lens holding units 51, 54 is constituted by using the V-shaped roller 52a or arranging the flat rollers 54d, 54e in the V-shape. In addition, strengths of two coil springs 44f arranged in the slits 44c may be varied, respectively, the springs being configured to urge the central portion 44a provided with the third lens unit 34 in the first lens holding unit 44 and the holding section 44b of the piezo element 20 in such a direction as to separate them from each other.

That is, this coil spring 44f allows the spacer 20e of the piezo element 20 to abut on the shaft member 45 with a predetermined pressing force, but this abutment force can be varied in a certain range. When the strengths of two coil springs 44f are varied, the V-shaped rollers 44e, 52a shown in FIGS. 22, 29 and the roller constituted by arranging the cylindrical flat rollers 54d, 54e in the V-shape with respect to the guide shaft member 46 as shown in FIG. 31 are pressed to abut on the guide shaft members 46 in the thrust direction with a force corresponding to a difference between the strengths of the coil springs 44f having the different strengths. Even if both of the rollers do not abut on the guide shaft member 46 at normal positions owing to the manufacturing error, the roller pressed by the coil spring 44f having a great strength abuts on the shaft member 46, and the optical axis of the held third lens unit 34 does not fluctuate.

Example 4

In the above description, any means for wiring to a piezo element 20 has not been mentioned. However, in a case where the piezo element 20 moves a first lens holding unit 44 itself that holds the element in this manner, a source power, a driving signal or an (electrical) signal such as an earth current is supplied usually using a flexible substrate, a flexible cable or the like. However, since a camera module itself aimed to be small and light as in the present embodiment is small, a certain degree of space has to be secured so that the flexible substrate follows a movable range of the first lens holding unit 44 in a case where the flexible substrate or the flexible cable is used. To solve the problem, in the camera module of the embodiment, this power supply is performed with a guide shaft member 46, a shaft member 45, a power supplying electrode disposed in a housing or the like.

First, a method of supplying the power by use of the guide shaft member 46 will be described. Any of the V-shaped roller 44e shown in FIG. 22, the V-shaped roller 52a and the cylindrical flat roller 52b shown in FIG. 29, the cylindrical flat rollers 54d, 54e held by the roller module 54a so as to form the V-shape with respect to the guide shaft member 46 shown in FIG. 31 and the like are made of a metal. Moreover, the guide shaft member 46 is made of a metal. This guide shaft member 46 and the rollers are constituted as a part of an electrical signal supply line which supplies a driving electrical signal of the piezo element 20, and the guide shaft member 46 is connected to a power source which supplies a driving power. The rollers are provided with the wiring line for supplying the electrical signal to the piezo element 20.

Moreover, in a method in which the shaft member 45 is used, for example, the shaft member denoted with 45 in FIG. 29 is made of a metal, and this shaft member 45 is connected to the power source for supplying the driving electrical signal. Moreover, a holding section 44b of the piezo element 20 in the first lens holding unit 44 is provided with a sliding brush denoted with 57 in FIG. 29, and this sliding brush 57 is connected to the piezo element 20 to supply the power. In this case, the sliding brush 57 is not disposed in only one direction as shown in FIG. 29. As shown in FIG. 32(A), two sliding brushes 67, 68 may be extended from the holding section 44b of the piezo element 20 so as to sandwich the shaft member 45 therebetween, so that electricity can efficiently be collected. Alternatively, as shown in FIG. 32(B), the shaft member 45 may be surrounded with a sliding brush 69, and the sliding brush 69 may be provided with such a spring property that the brush can urge an operating portion 20e of the piezo element 20 so as to bring the portion into contact under pressure with the shaft member 45.

Furthermore, in addition to the use of such a guide shaft member 46 or shaft member 45, a metal foil which can be energized, a conductive material or the like may be attached to an appropriate place of a housing of the camera module 40, or a conductor may be formed beforehand by etching or the like, and the sliding brush may be allowed to abut on the conductor to supply the power. In consequence, a space which is required for a case where the flexible substrate is used and in which the flexible substrate can follow the movable range of the first lens holding unit 44 is unnecessary. Even if the guide shaft member 46 or the shaft member 45 lengthens, the power supply is possible without any problem. Therefore, the camera module 40 can be constituted to be smaller.

Example 5

Moreover, in the above description, a double-focus type camera module has been described as an example in which as shown in FIG. 20, a second lens holding unit 42 is moved by a first lens holding unit 44 and fixed at a telephoto (tele) position and a wide-angle (wide) position. However, as described above, the second lens holding unit may be provided with a piezo element and constituted to be independently movable. A camera module may be constituted as not only the double-focus type camera module but also a usual zoom lens in which a focal length can continuously be changed. An embodiment in this case is shown in FIG. 33.

In FIG. 33, (A) is a perspective view of a camera module, and (B) is a sectional view showing a piezo element part. In the drawing, the same constituting elements as those in FIG. 20 are denoted with the same reference numerals. Reference numeral 32 is a first lens unit; 33 is a second lens unit; 34 is a third lens unit; 35 is an image pickup element; 61 is a first lens holding unit which holds the third lens unit 34; 62 is a second lens holding unit which holds the second lens unit 33; 63 is a third lens holding unit which holds the first lens unit 32; 61a is a first piezo element having an operating portion 61b; 62a is a second piezo element having an operating portion 62b; 64 is a shaft member on which the operating portions 61b, 62b of the piezo elements 61a, 62a abut; 65, 66 are guide shaft member; 61c, 62c are urging members; and 61d, 62d are guide portions into which the driving shaft 64 is inserted and which guide the first lens holding unit 61 and the second lens holding unit 62.

In a case where the camera module is: constituted in this manner, movement amounts of the lens holding units 61, 62 differ every time a focal length changes or focusing (focus adjustment) is, performed. Therefore, a flexible substrate or a flexible cable is usually used, and it is general to separately send driving electrical signals to the piezo elements 61a, 62a arranged in the lens holding units 61, 62, respectively. However, as described above in Example 4, this method requires a space where the flexible substrate can follow movable ranges of the lens holding units 61, 62 without interfering with the ranges, and also requires separate control circuits.

To solve the problem, in this embodiment, in the piezo elements 61a, 62a incorporated in the respective lens holding units 61, 62, a shape of a first surface formed in longitudinal and short directions as shown by 20b in FIG. 3 differs with each of the piezo elements 61a, 62a. In consequence, resonance frequencies at which the piezo elements 61a, 62a are movable are varied. For example, the piezo element 61a is driven at a first frequency, and the piezo element 62a is driven at a second frequency. Thus, a single driving circuit can separately drive the piezo elements 61a, 62a incorporated in a plurality of lens holding units 61, 62.

That is, as described in Patent Documents 6 to 11, a driving force is generated in accordance with the shape of each of the piezo elements 61a, 62a at an only specific resonance frequency. Therefore, when the piezo elements 61a, 62a incorporated in the lens holding units 61, 62, respectively, are provided with the different shapes as described above, the elements can be driven at the different resonance frequencies. During the changing of the focal length or the focusing (the focus adjustment), a driving electrical signal having the corresponding resonance frequency is sent to the piezo element 61a or 62a held in the lens holding unit 61 or 62 to be moved. In consequence, the only necessary lens unit is moved.

In this case, even when a power is supplied to a piezo element 20 by use of a guide shaft member 46 or a shaft member 45 described above with reference to FIGS. 29, 31, the single driving circuit can separately drive the lens holding units. For example, in a case where a plurality of lens holding units need to be moved during zooming, when the driving current having the corresponding resonance frequency is sent to the piezo element 20 stored in each lens holding unit in a time sharing manner, quick zooming is possible.

FIG. 34 shows one example of a piezo element driving control circuit for performing such a control. In the drawing, 70 is a lens holding unit position sensor which detects the present position of each lens holding unit, and 71 is a zooming instruction button which sends an instruction signal for moving a telephoto position or a wide-angle position. Reference numeral 72 is a focal length calculating section for auto-focusing, which sends an instruction for focusing to a control section 74 at a time when an image pickup instruction is sent to the camera module. Reference numeral 73 is a resonance frequency storage section which stores the resonance frequencies of the piezo elements 61a, 62a stored in the lens holding units 61, 62, and 74 is the control section which controls the whole camera module. To perform the zooming or focusing, the control section sends, to a piezo element driver 75, a signal having the resonance frequency corresponding to that of the piezo element 61a or 62a stored in the lens holding unit 61 or 62. Reference numerals 61a, 62a, . . . are the piezo elements 61a, 62a stored in the lens holding units 61, 62. As described above, in the piezo element driving control circuit of the embodiment, the driving current sent from the piezo element driver 75 is sent to all of the piezo elements 61a, 62a, . . . via a single signal line.

An operation of this piezo element driving control circuit shown in FIG. 34 will be described. When a power source of the camera module is turned on and the image pickup instruction is sent, the present positions of the lens holding units 61, 62 are sent from the lens holding unit position sensor 70 to the control section 74. Moreover, when the telephoto position or the wide-angle position of the zoom instruction button 71 is pressed, a signal of the button is also sent to the control section 74. The control section 74 calculates a degree of moving of either of the lens holding units 61, 62 with reference to the signal from the lens holding unit position sensor 70.

Moreover, the resonance frequencies of the piezo elements 61a, 62a stored in the lens holding units 61, 62 to be moved are read from the resonance frequency storage section 73. When a plurality of lens holding units 61, 62 are to be moved, the corresponding resonance frequencies are acquired. Moreover, an order of the moving of the lens holding units 61, 62 is determined. In a case where the units are individually moved, the signal having the resonance frequency corresponding to that of the piezo element of the lens holding unit to be moved is generated, and sent to the piezo element driver 75. When the plurality of lens holding units are moved, the order of the moving is determined, and the signals having the frequencies corresponding to the piezo elements are sent to the piezo element driver 75 in a time sharing manner so that the units do not interfere with each other.

Then, the piezo element driver 75 generates the driving current of the piezo element in response to the sent signal of the frequency, and sends the current to the signal line connected to the piezo elements 61a, 62a, . . . . Then, the piezo elements 61a, 62a, . . . stored in the lens holding units are driven only when the driving current of the resonance frequency corresponding to the element itself is sent, and the lens holding units 61, 62 are moved to predetermined positions. To perform the focusing with the auto-focus function, the piezo elements 62, 63 . . . stored in the necessary lens holding units are driven in accordance with a focusing operation instructed by the focal length calculating section 72.

When the driving control circuit of the piezo element is constituted in this manner and the power is supplied by the guide shaft members 65, 66, the shaft member 64, a power supplying electrode disposed in a housing or the like as described above, it is not necessary to interconnect directly to each piezo element by the flexible substrate as described above. In addition, since the single driving control circuit can drive separate piezo elements, the camera module can be constituted to be small and light.

It is to be noted that it has been described above that the piezo elements are driven at the corresponding resonance frequencies at different times, but the plurality of resonance frequencies may be superimposed, separated by filter means and sent to the piezo elements, respectively. In this case, the piezo elements or the lens holding units may be provided with the filter means. The plurality of driving signals of the frequencies may be superimposed by the control section 74 shown in FIG. 34, and sent as, electrical signals constituted of a source power, a driving signal, an earth current and the like by the piezo element driver 75 as described above. Moreover, the filter means disposed in each piezo element or lens holding unit may take the only driving signal of the frequency necessary for driving each piezo element to operate the element.

Figure 35:
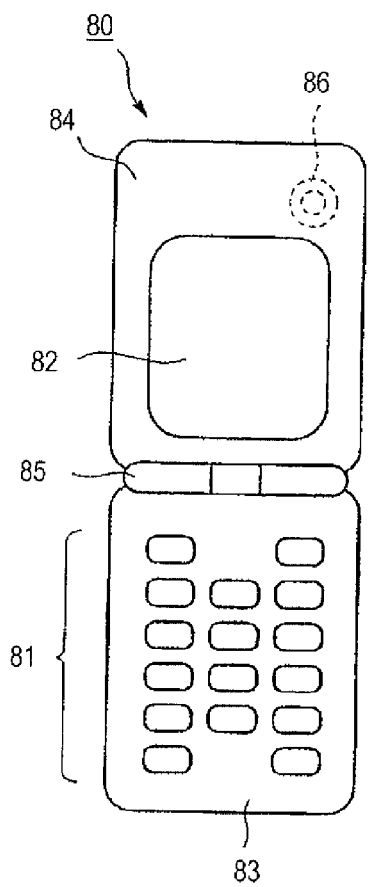
FIG. 35 is a diagram schematically showing one example of a cellular phone in which the camera module according to the present invention is incorporated.
Figure 36:
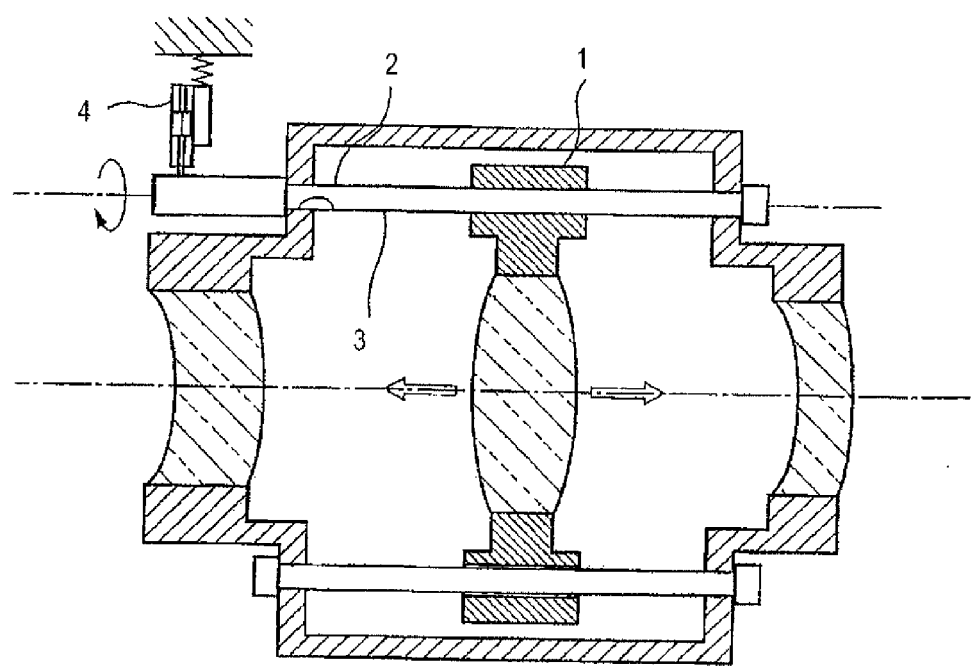
FIG. 36 is a diagram showing one example of a conventional camera module.
Figure 37:
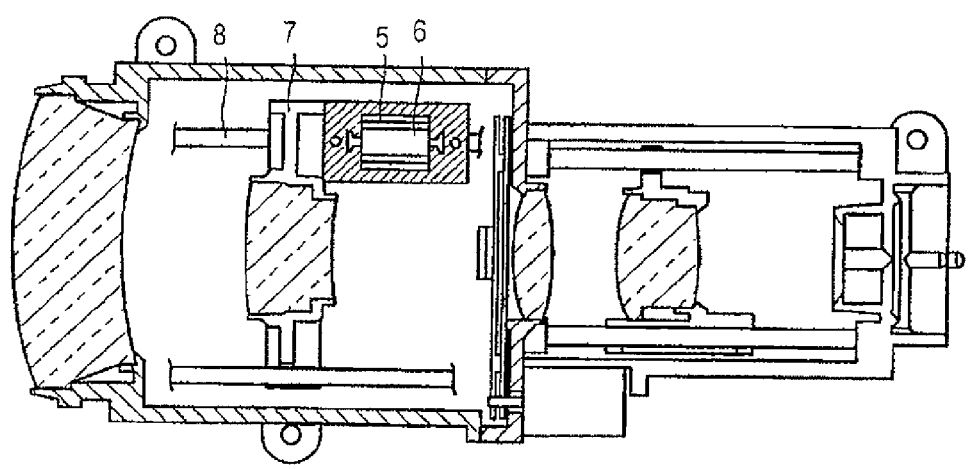
FIG. 37 is a diagram showing another example of the conventional camera module.

The camera modules of Examples 1 to 5 described above are incorporated in, for example, portable terminal. FIG. 35 is a plan view showing a cellular phone 80 as one example in a state (an opened state) in which an operating portion (an operating member) 81 and a display (a display member) 82 are visible. In the shown cellular phone 80, a first case section 83 including the mounted operating portion 81 is connected to a second case section 84 including the mounted display 82 via a hinge mechanism 85. The first and second case sections 83 and 84 are rotatable around the hinge mechanism 85. It is to be noted that the first and second case sections 83 and 84 constitute a case article.

As shown by broken double circular lines in the drawing, a camera module 86 according to Examples 1 to 5 described above is incorporated in the second case 84. When a predetermined button of the operating portion 81 is operated, image pickup is performed by the camera module 86, and an image picked up by the camera module 86 is displayed in, for example, the display 82. It is to be noted that an outer side of the second case section 84 of the camera module 86 is an upper side (an optical lens 23, 32 side) shown, for example, in FIGS. 8, 20, 27, 28 and 33. That is, the second case section 84 is provided with an opening in which the optical lens 23 or 32 of the camera module 86 is exposed. As not shown, a battery, a communication unit or the like is stored in the first case section 83. Furthermore, a thickness dimension of the second case section 84 is substantially regulated by a height of the camera module 86.

Thus, piezo elements are incorporated in twi lens holders, respectively, and driven in an optical axis direction. Therefore, a structure of a lens movement mechanism during driving of an optical lens system is remarkably simplified. There is an effect that even a camera module in which an auto-focus (AF) function and a zoom function are incorporated can be constituted to be small and light.

INDUSTRIAL APPLICABILITY

It is possible to constitute a small and light camera module in which an auto-focus (AF) function and a zoom function are incorporated, and the camera module is optimum as a camera module to be incorporated in various small portable terminals.

The invention claimed is:

1. A camera module comprising:
a lens holding unit which holds at least one or more optical lenses and which includes a first bearing section;
a first shaft member which is inserted into the first bearing section and which is substantially disposed in parallel with an optical axis; and
a piezo element including, at an end portion thereof, an operating portion which abuts on a circumferential surface of the first shaft member, the piezo element being disposed in the lens holding unit and warping so as to move the operating portion in an axial direction of the first shaft member when supplied with a voltage.

2. The camera module according to claim 1, wherein a surface of the operating portion at which the operating portion abuts on the circumferential surface of the first shaft member is rougher than a surface of the first bearing section on which the first shaft member slides.

3. The camera module according to claim 1 or 2, wherein a friction coefficient between the first bearing section and the first shaft member is set to be smaller than that between the operating portion and the first shaft member.

4. The camera module according to claim 3, wherein the first bearing section has a substantially V-shaped section; and the V-shaped section slides on the first shaft member.

5. The camera module according to claim 4, wherein the first bearing section has V-shaped sections at two places of the first shaft member in an axial direction; and
the operating portion is positioned between the V-shaped sections at the two places.

6. The camera module according to claim 5, further comprising:
a second bearing section disposed in the lens holding unit; and
a second shaft member which is inserted into the second bearing section and which is disposed in a position substantially parallel to the optical axis and substantially symmetric with respect to the first shaft member via an optical axis, wherein
the surface of the second shaft member being subjected to substantially the same surface processing as that of the surface of the second place of the first shaft member which slides on the first bearing section.

7. A camera module comprising:
a lens holding unit which holds at least one or more optical lenses and which includes a first bearing section;
a first shaft member which is inserted into the first bearing section and which is substantially disposed in parallel with an optical axis;

a piezo element including, at an end portion thereof, an operating portion which abuts on the first shaft member, the element being disposed in the lens holding unit to move the lens holding unit; and
a second shaft member which guides the lens holding unit, wherein
at least the first shaft member or the second shaft member is configured to supply an electric signal to drive the piezo element.

8. The camera module according to claim 7, further comprising:
a first lens holding unit and a second lens holding unit each including the piezo element,
a first piezo element stored in the first lens holding unit, being drivable by a signal of a first frequency,
a second piezo element stored in the second lens holding unit, being drivable by a signal of a second frequency;
the camera module further comprising:
a common signal supply member which supplies the signal of the first frequency to the first piezo element and the signal of the second frequency to the second piezo element.

9. The camera module according to claim 8, further comprising:
first signal supply means for selectively supplying the signal of the first frequency and the signal of the second frequency to the signal supply member.

10. The camera module according to claim 8, further comprising:
second signal supply means for superimposing the signal of the first frequency and the signal of the second frequency to supply the signals to the signal supply member;
first filter means for acquiring the signal of the first frequency from the signal supplied from the signal supply member; and
second filter means for acquiring the signal of the second frequency from the signal supplied from the signal supply member, wherein
the camera module is configured to supply an output of the first filter means to the first piezo element and to supply an output of the second filter means to the second piezo element.

11. The camera module according to any one of claims 7 to 10, wherein the lens holding unit includes a second bearing section which abuts on the second shaft member, and supplies the electric signal via one or both of the first and second bearing sections.

12. The camera module according to claim 11, wherein the lens holding unit includes a sliding member which comes into slidable contact with the shaft member, and supplies the electric signal via the sliding member.

13. The camera module according to claim 12, wherein the sliding member surrounds the shaft member and urges the piezo element to abut on the shaft member.

14. The camera module according to claim 13, further comprising:
urging means which is disposed in the lens holding unit and which urges the piezo element in a direction in which the operating portion abuts on the first shaft member.

15. A portable terminal comprising:
a camera module including:
a lens holding unit which holds at least one or more optical lenses and includes a first bearing section;
a first shaft member which is inserted into the first bearing section and substantially disposed in parallel with an optical axis; and a piezo element including, at an end portion thereof, an operating portion which abuts on the first shaft member, the element being disposed in the lens holding unit, wherein surface processing of the first shaft member at a first place to abut on the operating portion differs from that at a second place to slide on the first bearing section;

an operation member; a display; a battery; a communication unit; and a housing which stores the camera module, the display, the battery and the communication unit, a thickness of the housing being limited substantially to height of the camera module.

16. A portable terminal comprising:

a camera module including:

a lens holding unit which holds at least one or more optical lenses;

a driving member which movably drives the lens 5 holding unit; and a guide shaft member which guides the lens holding unit or a shaft member which transmits a driving force to the lens holding unit via the driving member, wherein the camera module being configured to supply an electric signal for driving the driving member to at least the shaft member or the guide shaft member; and an operation member; a display; a battery; a communication unit; and a housing which stores the camera module, the display, the battery and the communication unit, a thickness of the housing being limited substantially to a height of the camera module.

17. A portable terminal comprising:

a camera module including;

a lens holding unit which holds at least one or more optical lenses and which includes a first bearing section, a first shaft member which is inserted into the first bearing section and which is substantially disposed in parallel with an optical axis, a piezo element including, at an end portion thereof, an operating portion which abuts on the first shaft member, the element being disposed in the lens holding unit, and a second shaft member which guides the lens holding unit, wherein surface processing of the first shaft member at a first place to abut on the operating portion differs from that at a second place to slide on the first bearing section, at least the first shaft member or the second shaft member being configured to supply an electric signal to drive the piezo element;

an operation member; a display; a battery; a communication unit; and a housing which stores the camera module, the display, the battery and the communication unit, a thickness of the housing being limited substantially to a height of the camera module.

18. The portable terminal according to any one of claims 15 to 17, wherein the camera module further includes a first lens holding unit and a second lens holding unit each including the piezo element;

a first piezo element stored in the first lens holding unit is drivable by a signal of a first frequency; and a second piezo element stored in the second lens holding unit is drivable by a signal of a second frequency; and the camera module further includes a common signal supply member which supplies the signal of the first frequency to the first piezo element and which supplies the signal of the second frequency to the second piezo element.

* * * * *